(12) United States Patent
Nonaka et al.

(10) Patent No.: US 8,801,881 B2
(45) Date of Patent: Aug. 12, 2014

(54) PRODUCTION METHOD OF FLAT PANEL DISPLAY

(71) Applicant: Nitto Denko Corporation, Ibaraki (JP)

(72) Inventors: Takahiro Nonaka, Ibaraki (JP); Masato Fujita, Ibaraki (JP); Masahito Niwa, Ibaraki (JP); Kaori Miki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 5 days.

(21) Appl. No.: 13/793,577

(22) Filed: Mar. 11, 2013

(65) Prior Publication Data

US 2013/0240116 A1    Sep. 19, 2013

(30) Foreign Application Priority Data

Mar. 12, 2012 (JP) ................. 2012-055115

(51) Int. Cl.
*B32B 41/00* (2006.01)
*C09J 5/00* (2006.01)
*G02F 1/1333* (2006.01)

(52) U.S. Cl.
CPC .............. *C09J 5/00* (2013.01); *B32B 2457/202* (2013.01); *C09J 2203/318* (2013.01); *C09J 2205/302* (2013.01); *B32B 2457/20* (2013.01); *G02F 2001/133331* (2013.01); *G02F 2202/28* (2013.01); *G02F 2203/68* (2013.01); *Y10S 156/924* (2013.01); *Y10S 156/937* (2013.01)
USPC ............. 156/64; 156/350; 156/378; 156/379; 156/718; 156/763; 156/924; 156/937

(58) Field of Classification Search
CPC ..................... B32B 2457/20; B32B 2457/202; C09J 2203/318; C09J 2205/302; C09J 5/00; G02F 2001/133331; G02F 2202/28; G02F 2203/68
USPC .......... 156/64, 350, 378, 379, 718, 763, 924, 156/937
See application file for complete search history.

(56) References Cited

U.S. PATENT DOCUMENTS

| 2003/0232192 A1 | 12/2003 | Kishioka et al. |
| 2004/0191509 A1 | 9/2004 | Kishioka et al. |
| 2010/0110354 A1 | 5/2010 | Suzuki et al. |
| 2010/0129658 A1 | 5/2010 | Suzuki et al. |

FOREIGN PATENT DOCUMENTS

| JP | 2003-238915 A | 8/2003 |
| JP | 2003-342542 A | 12/2003 |
| JP | 2004-231723 A | 8/2004 |
| JP | 2008-266473 A | 11/2008 |
| JP | 2010-121134 A | 6/2010 |

*Primary Examiner* — Katarzyna Wyrozebski Lee
*Assistant Examiner* — Joshel Rivera
(74) *Attorney, Agent, or Firm* — Sughrue Mion, PLLC

(57) ABSTRACT

A method of producing a flat panel display including step 1-step 4, or step 1-step 5, where at least one of the optical elements after step 4 or step 5 can be reused as an optical element in step 1:

step 1: adhering two optical elements to each other via an adhesive sheet or a curable resin layer, and applying an autoclave treatment to give an optical laminate step 2: checking the appearance of the optical laminate obtained in step 1 step 3: assembling a flat panel display using the optical laminate that passed the check in step 2 step 4: separating the two optical elements in an optical laminate that was rejected by the check in step 2 by relatively rotating them with a vertical line penetrating the opposing faces thereof as a rotation axis step 5: washing the optical element resulting from step 4.

12 Claims, 2 Drawing Sheets

PRODUCTION METHOD OF FLAT PANEL DISPLAY

FIELD OF THE INVENTION

The present invention relates to a production method of a flat panel display extremely advantageous for the reduction of material costs and energy costs.

BACKGROUND OF THE INVENTION

In recent years, display devices such as liquid crystal display (LCD) and the like, and input devices such as touch panel and the like, which are used in combination with the above-mentioned display devices, have been widely used in various fields. For production of such display devices and input devices and the like, transparent adhesive sheets and transparent curable resin layers, which cure with heat or UV (e.g., curable resins such as acrylic resin, urethane acrylate, silicone and the like, which cure with heat or UV) are used to adhere optical elements. For example, a transparent adhesive sheet is used to adhere a transparent protection plate, a touch panel, a lens and the like to a liquid crystal panel (e.g., JP-A-2003-238915, JP-A-2003-342542, JP-A-2004-231723).

However, when an optical element is adhered to a liquid crystal panel via a transparent adhesive sheet, adhesion may be repeatedly tried when inconvenience occurs such as inaccurate positioning of the liquid crystal panel and the optical element, air void involved between them that lowers the visibility of the display and the like. Therefore, the Applicants of the present application proposed a polyoxyalkylene adhesive sheet as a transparent adhesive sheet superior in reseparatability, which can be stuck again (JP-A-2008-266473).

The Applicant of the present application also proposed a method of separating two optical elements adhered to each other via a pressure-sensitive adhesive sheet, without allowing breakage or crack in them (JP-A-2010-121134). In this method, two optical elements (e.g., liquid crystal panel and transparent protection plate) adhered to each other via a pressure-sensitive adhesive sheet or a curable resin layer are separated by relatively moving the two optical elements in parallel to each other to cause a shear stress leading to the rupture of the pressure-sensitive adhesive sheet or curable resin layer.

SUMMARY OF THE INVENTION

As portable instruments with display function such as portable telephone, Personal Digital Assistant (PDA), handheld game machine, car-navigation system and the like are becoming thinner, liquid crystal displays to be mounted on these instruments are also becoming thinner at a remarkable speed in recent years, along with which liquid crystal panels and optical elements to be adhered thereto are also designed to be thinner. When a liquid crystal panel and an optical element adhered to each other via a transparent pressure-sensitive adhesive sheet are to be separated, therefore, conventional methods require a separation work to be performed at a low speed to reduce damage on the liquid crystal panel and the optical element. In addition, due to the increased demand for mobile phones, particularly smartphones, the frequency of readhesion work of a liquid crystal panel and an optical element increases. Therefore, the total cost for the industrial production of a liquid crystal display tends to increase.

Therefore, the problem to be solved by the present invention is provision of a production method of a flat panel display comprising an optical laminate of optical elements such as a liquid crystal panel, a transparent protection plate, a touch panel, a lens and the like, which are adhered to each other via an adhesive sheet or a curable resin layer, which method enables, when the optical laminate in the flat panel display is defective and re-adhesion is necessary, efficient recovery of the optical elements to permit reuse thereof.

The present inventors have conducted intensive studies in an attempt to solve the above-mentioned problems, as a result of which they have found that optical elements in an optical laminate, which are adhered to each other via an adhesive sheet or a curable resin layer, can be efficiently separated without damage by relatively rotating the optical elements with a vertical line penetrating the opposing faces of the optical elements as a rotation axis, and such separation of the optical elements can be performed by an automatic machine. They have made further studies based on such finding and completed the present invention.

Accordingly, the present invention provides the following.

[1] A method of producing a flat panel display comprising an optical laminate wherein two optical elements are adhered to each other via an adhesive sheet or a curable resin layer, which comprises
  the following step 1-step 4, or step 1-step 5, and permits reuse of at least one of the optical elements after step 4 or step 5 as an optical element in step 1:
  step 1: a step of adhering two optical elements to each other via an adhesive sheet or a curable resin layer, and applying an autoclave treatment to give an optical laminate
  step 2: a step of checking the appearance of the optical laminate obtained in step 1
  step 3: a step of assembling a flat panel display using the optical laminate that passed the check in step 2
  step 4: a step of separating the two optical elements in an optical laminate that was rejected by the check in step 2 by relatively rotating them with a vertical line penetrating the opposing faces thereof as a rotation axis
  step 5: a step of washing the optical elements resulting from step 4.

[2] The method of the above-mentioned [1], wherein step 4 is performed by an automatic machine.

[3] The production method of the above-mentioned [1] or [2], wherein step 4 comprises relatively rotating the two optical elements with a vertical line penetrating the opposing faces thereof as a rotation axis, and then relatively moving the two optical elements in parallel to each other.

[4] The method of any one of the above-mentioned [1] to [3], wherein the rotation axis in the relative rotation of the optical elements is a vertical line penetrating the center of gravity (center) of the opposing faces of the two optical elements or the vicinity thereof.

[5] The method of any one of the above-mentioned [1] to [4], wherein the relative rotation of the optical elements comprises accelerating in the initial motion and rotating the two optical elements after the initial motion at a rate of not less than 0.01 (degrees/sec) and less than 50 (degrees/sec).

[6] The method of the above-mentioned [5], wherein the initial motion occurs within 1 second from the start of the rotation.

[7] The method of the above-mentioned [6], wherein the acceleration in the initial motion is less than 30000 (degrees/$sec^2$).

[8] The method of any one of the above-mentioned [1] to [7], wherein the two optical elements in the optical laminate are a display panel and a touch panel, a display panel and a transparent protection plate, or a touch panel and a transparent protection plate.

[9] The method of any one of the above-mentioned [1] to [8], wherein the two optical elements in the optical laminate are adhered to each other via an adhesive sheet or a curable resin layer having an area approximately the same as that of the opposing surfaces of the two optical elements.

[10] The method of any one of the above-mentioned [1] to [9], wherein the adhesive sheet is an acrylic adhesive sheet containing an acrylic polymer (X).

[11] The method of the above-mentioned [10], wherein the aforementioned acrylic polymer (X) comprises a monomer component comprising 50-100 wt % of (meth)acrylic acid alkyl ester having a straight chain or branched chain alkyl group having 1-14 carbon atoms and not less than 0 wt % and less than 15 wt % of a polar group-containing monomer relative to the total amount (100 wt %) of the monomer component.

[12] The method of the above-mentioned [10] or [11], wherein the acrylic adhesive sheet has a gel fraction of 20-75 wt %.

[13] A method of producing a flat panel display comprising an optical laminate wherein two optical elements are adhered to each other via an adhesive sheet or a curable resin layer, which comprises step 1: a step of adhering two optical elements to each other via an adhesive sheet or a curable resin layer, and applying an autoclave treatment to give an optical laminate step 2: a step of checking the appearance of the optical laminate obtained in step 1 step 3: a step of assembling a flat panel display using the optical laminate that passed the check in step 2 step 4: a step of separating the two optical elements in an optical laminate that was rejected by the check in step 2 by an automatic machine step 5: a step of washing the optical elements resulting from step 4.

According to the production method of the flat panel display of the present invention, an optical laminate assembled on the display surface side of a flat panel display is checked for appearance, and optical elements are efficiently recovered from an optical laminate rejected by the check and reused, and therefore, the total costs including material cost and energy cost can be greatly reduced in industrial production (large-scale production) of the flat panel display.

Figure 1:
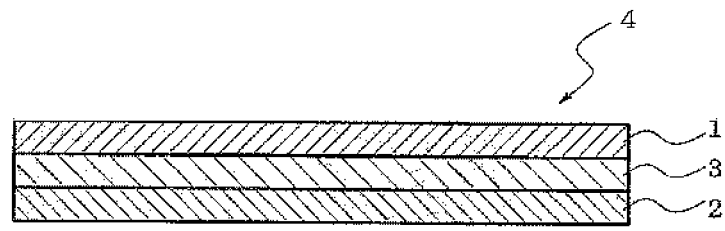
FIG. 1 is a schematic view of an optical laminate by the method of the present invention.

In the Figures, 1, 2 are plates, 3 is an adhesive sheet or curable resin layer, 4 is a laminate, 5 is a double-faced adhesive sheet, 6, 9 are jig, 7 is a frame, 8 is pedestal, 10 is a driving means (servomotor), and L is a rotation axis.

DETAILED DESCRIPTION OF THE INVENTION

The present invention is explained in more detail in the following by referring to an embodiment thereof.

The flat panel display produced in the present invention is a flat panel display provided with an optical laminate, wherein two optical elements are adhered to each other via an adhesive sheet or a curable resin layer, on the display surface side.

The production method of the flat panel display of the present invention is mainly characterized by having step 1-step 4, or step 1-step 5, described below, and reusing an optical element resulting from step 4 or step 5 as an optical element in step 1:

step 1: a step of adhering two optical elements to each other via an adhesive sheet or a curable resin layer, and applying an autoclave treatment to give an optical laminate step 2: a step of checking the appearance of the optical laminate obtained in step 1 step 3: a step of assembling a flat panel display using the optical laminate that passed the check in step 2 step 4: a step of separating the two optical elements in an optical laminate that was rejected by the check in step 2 by relatively rotating them with a vertical line penetrating the opposing faces thereof as a rotation axis step 5: a step of washing the optical element resulting from step 4.

In the present invention, the "flat panel display" is a concept including liquid crystal display (LCD), plasma display (PDP), organic or inorganic electroluminescence display (ELD), surface-conduction electron-emitter display (SED), electron paper and the like. The "display panel" of a liquid crystal display is referred to as "LCD panel", the "display panel" of plasma display is referred to as "PDP panel", and the "display panel" of organic or inorganic electroluminescence display is referred to as "ELD panel".

In addition, the "optical element" refers to a member having optical properties (e.g., polarized nature, photorefractivity, light scattering, light reflectivity, light permeability, light absorbability, light diffraction characteristics, optical rotation, visibility and the like), which is provided on the display surface side of a flat panel display and is not particularly limited as long as it is a sheet (film) or plate member having optical properties. Specific examples thereof include display panel, touch panel, transparent protection plate, and constitution members of the display panel and touch panel. Specific examples of the constitution member include deflecting plate, wavelength plate, retardation difference plate, optics compensated film, brightness enhancement film, lightguide plate, reflection film, antireflection film, transparent conductive film (ITO film and the like), glass plate having transparent electrode, design film, decorative film, prism, lens, color filter, transparent substrate and a laminate of two or more of these. In the present invention, the "optical element" refers not only to a member constituting a display panel and a touch panel, but also a panel itself.

An optical element to be provided on the display surface side of a flat panel display generally has a thickness of about 0.01-5 mm. As the transparent protection plate (surface protection plate), a glass optical element and a transparent plastic optical element can be mentioned. As the transparent plastic optical element, plastic optical element made of (meta)acrylic resin (e.g., PMMA), polycarbonate (PC), polypropylene (PP), polyphenylene sulfide, poly(ethylene terephthalate) (PET), poly(ethylene naphthalate) (PEN), triacetylcellulose (TAC) resin, ARTON, epoxy resin, polyimide resin, polyetherimide resin, polyamide resin, polysulfone, polyethersulfone and the like can be mentioned, where the thickness thereof is about 0.01-5 mm. As the glass plate, soda glass plate, borosilicate glass, alkali-free glass plate and the like can be mentioned, where the thickness thereof is about 0.01-5 mm. In addition, as the glass optical element, soda glass optical element, borosilicate glass optical element, nonalkali glass optical element and the like can be mentioned, and the thickness thereof is about 0.01-5 mm.

The materials to be used, the contents of operation and the like are explained below in the order of steps.

[Step 1]

In this step, two optical elements are adhered to each other via an adhesive sheet or a curable resin layer, and subjected to an autoclave treatment to give an optical laminate.

In the present invention, the optical laminate wherein two optical elements are adhered to each other via an adhesive sheet or a curable resin layer is not particularly limited. Specific examples include a laminate comprised of display panel/adhesive sheet or curable resin layer/touch panel, a laminate comprised of display panel/adhesive sheet or curable resin layer/transparent protection plate, a laminate comprised of touch panel/adhesive sheet or curable resin layer/transparent protection plate, a laminate comprised of display panel/adhesive sheet or curable resin layer/deflecting plate, touch panel/adhesive sheet or curable resin layer/deflecting plate and the like.

The flat plane size of the optical laminate wherein two optical elements are adhered to each other via an adhesive sheet or a curable resin layer is generally 3,000-30,000 mm$^2$, preferably 4,500-28,000 mm$^2$. The areas of the two optical elements (flat plane areas) may be the same or different. The "optical laminate wherein two optical elements are adhered to each other via an adhesive sheet or curable resin layer" typically means "optical laminate wherein two optical elements are adhered to each other via an adhesive sheet or curable resin layer having an area nearly the same as that of the opposing areas of the elements". Here, the "area of opposing surfaces" strictly means the area of regions in the opposing surfaces of two optical elements, which areas are indeed opposing. The "nearly the same as the area of the opposing surfaces" means that the area of an adhesive sheet or curable resin layer is not completely the same as the area of the opposing surfaces, and may be smaller than the area of the opposing surfaces by not more than 20%.

FIG. 1 shows a typical example of the "optical laminate wherein two optical elements are adhered to each other via an adhesive sheet or curable resin layer", wherein an adhesive sheet or curable resin layer 3 having nearly the same area as the two optical elements 1, 2 having the same area (flat plane area) adheres to opposing surfaces of the two optical elements to provide optical laminate 4 wherein two optical elements 1, 2 are adhered.

The adhesive sheet or curable resin layer is generally a transparent adhesive sheet or a transparent curable resin layer. The haze of the transparent adhesive sheet or transparent curable resin layer (according to JIS K 7136) is, for example, preferably 3.0% or less, more preferably 1.5% or less. When the above-mentioned haze is 3.0% or less, an optical laminate has good transparency and good appearance. While the total light transmittance (total light transmittance in visible light wavelength region, according to JIS K 7361-1) of the transparent adhesive sheet or transparent curable resin layer relating to the present invention is preferably 87% or more, more preferably 89% or more. When the above-mentioned total light transmittance is 87% or more, an optical laminate has good transparency and good appearance. The haze and total light transmittance can be obtained by, for example, adhering the transparent adhesive sheet or transparent curable resin layer to a slide glass (e.g., total light transmittance 92%, haze 0.2%) and measuring them by a haze meter (manufactured by Murakami Color Research Laboratory, trade name "HM-150").

As the transparent curable resin layer, a transparent curable resin which cures with heat or UV (e.g., curable resins that cure with heat or UV, such as acrylic resin, urethane acrylate, silicone and the like) is used. Examples of the transparent pressure-sensitive adhesive sheet include known transparent pressure-sensitive adhesive sheets used for optical applications, and include transparent pressure-sensitive adhesive sheets of acrylic, silicone and the like, and the transparent polyoxyalkylene pressure-sensitive adhesive sheet proposed in JP-A-2008-266473 by the applicant of the present application (i.e., a transparent pressure-sensitive adhesive sheet made of a cured product obtained by curing a composition containing a polyoxyalkylene polymer containing at least one alkenyl group in one molecule, a compound containing two or more hydrosilyl groups on average in one molecule and a hydrosilylation catalyst). As a particularly preferable transparent adhesive sheet, an acrylic adhesive sheet (A) described below, which contains an acrylic polymer (X) can be mentioned. The acrylic adhesive sheet (A) described below easily develop cohesive failure due to a shear stress. Therefore, an optical laminate wherein two optical elements are adhered to each other via the acrylic adhesive sheet (A) described below is more rapidly separated into two optical elements when subjected to step 4.

<Acrylic Adhesive Sheet (A)>

The acrylic adhesive sheet (A) is an acrylic adhesive sheet containing the below-mentioned acrylic polymer (X). While it is not particularly limited, the sheet preferably contains acrylic polymer (X) as a main component. In the present specification, to contain acrylic polymer (X) as a main component means that the content of acrylic polymer (X) in the acrylic adhesive sheet (A) (100 wt %) is 50 wt % or more. The acrylic adhesive sheet (A) preferably contains, besides acrylic polymer (X), a silane coupling agent, and other additives where necessary. The above-mentioned components (acrylic polymer (X), silane coupling agent, other additives) can be used alone, or two or more kinds thereof may be used in combination.

While the gel fraction of the acrylic adhesive sheet is not particularly limited, it is preferably 20-75 wt %.

The acrylic adhesive sheet (A) is an adhesive sheet formed from an acrylic adhesive composition. While the acrylic adhesive composition is not particularly limited, for example, an acrylic adhesive composition containing acrylic polymer (X) as an essential component, an acrylic adhesive composition containing a mixture of a monomer components forming the acrylic polymer (X) (sometimes to be referred to as a "monomer mixture") or a partial polymer thereof as an essential component, and the like can be mentioned. While it is not particularly limited, the former may be, for example, so-called a solvent type adhesive composition and the like, and the latter may be, for example, so-called an activation energy line curable pressure sensitive adhesive composition and the like. The above-mentioned acrylic adhesive composition preferably contains a silane coupling agent besides the essential component (acrylic polymer (X), a monomer mixture or a partial polymer thereof), and other additives where necessary.

The above-mentioned "acrylic adhesive composition" also means a "composition for forming an acrylic adhesive layer". In addition, the above-mentioned "monomer mixture" means a mixture comprised only of a monomer component that forms acrylic polymer (X). Furthermore, the above-mentioned "partial polymer substance" means the above-mentioned monomer mixture wherein one or more constituent components are partially polymerized.

The above-mentioned acrylic polymer (X) is an acrylic polymer formed (constituted) using a (meth)acrylic acid alkylester containing a straight chain or branched chain alkyl group having 1 to 14 carbon atoms as an essential monomer component. The above-mentioned acrylic polymer (X) can be used alone, or two or more kinds thereof may be used in combination. In the present specification, the above-mentioned "(meth)acrylic acid alkylester containing a straight chain or branched chain alkyl group having 1 to 14 carbon atoms" is sometimes referred to as "$C_{1-14}$ alkyl(meth)acrylate". In addition, "(meth)acrylic" means "acrylic" and/or "methacryl" (one or both of "acrylic" and "methacryl"), and the same applies to the following.

As the monomer component forming the above-mentioned acrylic polymer (X), a polar group-containing monomer, an alicyclic monomer or a multifunctional monomer may be used as the optional monomer component (copolymerizable monomer component) besides the above-mentioned $C_{1-14}$ alkyl(meth)acrylate. Furthermore, other monomers may also be used. Of these, acrylic polymer (X) is preferably an acrylic polymer formed using $C_{1-14}$ alkyl(meth)acrylate and a polar group-containing monomer as essential monomer components, more preferably an acrylic polymer formed using $C_{1-14}$ alkyl(meth)acrylate, a polar group-containing monomer and an alicyclic monomer as essential monomer components, further preferably an acrylic polymer formed using $C_{1-14}$ alkyl(meth)acrylate, a polar group-containing monomer, an alicyclic monomer and a multifunctional monomer as essential monomer components.

While the above-mentioned $C_{1-14}$ alkyl(meth)acrylate is not particularly limited, for example, methyl(meth)acrylate, ethyl(meth)acrylate, propyl(meth)acrylate, isopropyl(meth)acrylate, n-butyl(meth)acrylate, isobutyl(meth)acrylate, sec-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth)acrylate and tetradecyl(meth)acrylate can be mentioned. Of these, alkyl(meth)acrylate containing a straight chain or branched chain alkyl group having 4 to 12 carbon atoms ($C_{4-12}$ alkyl(meth)acrylate) is preferable, alkyl(meth)acrylate containing a straight chain or branched chain alkyl group having 4 to 10 carbon atoms ($C_{4-10}$ alkyl(meth)acrylate) is more preferable, alkyl acrylate containing a straight chain or branched chain alkyl group having 4 to 10 carbon atoms ($C_{4-10}$ alkyl acrylate) is further preferable, and 2-ethylhexyl acrylate (2EHA) or n-butyl acrylate (BA) is particularly preferable. The above-mentioned $C_{1-14}$ alkyl(meth)acrylate can be used alone, or two or more kinds thereof may be used in combination.

From the aspect of adhesiveness of acrylic adhesive sheet (A), the content of the above-mentioned $C_{1-14}$ alkyl(meth)acrylate in the total monomer component forming the acrylic polymer (X) is 50-100 wt % (50 wt % or more and 100 wt % or less), preferably 55-99.9 wt %, more preferably 60-99.5 wt %, still more preferably 65-99 wt %, further preferably 65-98.5 wt %, most preferably 70-95 wt %, relative to the total amount (100 wt %) of the monomer components forming the acrylic polymer (X).

The above-mentioned polar group-containing monomer is a monomer having a polar group in a molecule (particularly, unsaturated ethylene monomer) and, for example, carboxyl group-containing monomers such as (meth)acrylic acid, itaconic acid, maleic acid, fumaric acid, crotonic acid, isocrotonic acid and the like, or an anhydride thereof (e.g., acid anhydride group-containing monomer such as maleic anhydride, itaconic anhydride etc., and the like); hydroxyalkyl (meth)acrylates such as 2-hydroxyethyl(meth)acrylate, 3-hydroxypropyl(meth)acrylate, 4-hydroxybutyl(meth)acrylate, 6-hydroxyhexyl(meth)acrylate and the like, hydroxyl group-containing monomers such as vinylalcohol, allylalcohol and the like; amide group-containing monomers such as (meth)acrylamide, N,N-dimethyl(meth)acrylamide, N-methylol(meth)acrylamide, N-methoxymethyl(meth)acrylamide, N-butoxy methyl(meth)acrylamide, N-hydroxyethyl(meth)acrylamide and the like; amino group-containing monomers such as aminoethyl(meth)acrylate, dimethylaminoethyl(meth)acrylate, t-butylaminoethyl(meth)acrylate and the like; epoxy group-containing monomers such as glycidyl(meth)acrylate, methylglycidyl(meth)acrylate and the like; cyano group-containing monomers such as acrylonitrile, methacrylonitrile and the like; heterocyclyl-containing vinyl monomers such as N-vinyl-2-pyrrolidone, (meth)acryloylmorpholine, N-vinylpyridine, N-vinylpiperidone, N-vinylpyrimidine, N-vinylpiperazine, N-vinylpyrrole, N-vinylimidazole, N-vinyloxazole and the like; sulfo group-containing monomers such as sodium vinylsulfonate and the like; phosphate group-containing monomers such as 2-hydroxyethylacryloylphosphate and the like; imide group-containing monomers such as cyclohexylmaleimide, isopropylmaleimide and the like; isocyanate group-containing monomers such as 2-methacryloyloxyethylisocyanate etc., and the like can be mentioned. The above-mentioned polar group-containing monomers can be used alone, or two or more kinds thereof may be used in combination.

The above-mentioned polar group-containing monomer is preferably at least one kind of monomer selected from the group consisting of a carboxyl group-containing monomer, a hydroxyl group-containing monomer and a nitrogen atom-containing monomer. The above-mentioned carboxyl group-containing monomer also includes acid anhydride of the carboxyl group-containing monomer. In addition, the above-mentioned nitrogen atom-containing monomer is a monomer containing at least one nitrogen atom in a molecule. Examples of the above-mentioned nitrogen atom-containing monomer include the above-mentioned amide group-containing monomer and the above-mentioned heterocyclyl-containing vinyl monomer, which contain a nitrogen atom, and the like. Of those, N-vinyl-2-pyrrolidone (NVP) is preferable. The above-mentioned polar group-containing monomer is particularly preferably a carboxyl group-containing monomer or a hydroxyl group-containing monomer, and most preferably acrylic acid (AA) or acrylic acid 2-hydroxyethyl (HEA). The above-mentioned carboxyl group-containing monomer, hydroxyl group-containing monomer and nitrogen atom-containing monomer can be used alone, or two or more kinds thereof may be used in combination.

From the aspect of reworkability, the content of the above-mentioned polar group-containing monomer in the total monomer component forming the acrylic polymer (X) is preferably less than 15 wt %, more preferably less than 10 wt %, further preferably less than 5 wt %, particularly preferably less than 1 wt %, relative to the total amount (100 wt %) of the monomer components forming the acrylic polymer (X). While the lower limit is not particularly limited, it is generally 0 wt % or more, preferably higher than 0 wt %, still more preferably 0.1 wt % or more, further preferably 0.3 wt % or more. When the above-mentioned content is less than 15 wt %, the adhesive force does not become too high and superior reworkability can be obtained. A polar group-containing monomer may not be used as a monomer component forming acrylic polymer (X). However, a polar group-containing monomer is preferably used to some extent, since it improves adhesive force to an optical element. It is more preferable that the total amount (total content) of the carboxyl group-containing monomer, hydroxyl group-containing monomer and nitrogen atom-containing monomer in the total monomer components forming the acrylic polymer (X) satisfies the above-mentioned range.

The above-mentioned alicyclic monomer is a monomer which is an alicyclic compound, that is, a monomer having a nonaromatic ring in a molecule. Examples of the above-mentioned nonaromatic ring include nonaromatic alicyclic rings (cycloalkane rings such as cyclopentane ring, cyclohexane ring, cycloheptane ring, cyclooctane ring and the like; cycloalkene rings such as cyclohexene ring etc., and the like), non-aromatic bridged rings (e.g., bridge hydrocarbocycles such as bicyclic hydrocarbocycle in pinane, pinene, bornane, norbornene, norbornane and the like; tricyclic hydrocarbocycle in adamantane and the like, tetracyclic hydrocarbocycle etc., and the like) and the like.

The above-mentioned alicyclic monomer is not particularly limited. Examples thereof include cycloalkyl(meth)acrylates such as clopentyl(meth)acrylate, cyclohexyl(meth)acrylate, cycloheptyl(meth)acrylate, cyclooctyl(meth)acrylate and the like; (meth)acrylic acid esters containing bicyclic hydrocarbocycle such as isobornyl(meth)acrylate and the like; (meth)acrylic acid esters containing tricyclic or more hydrocarbocycle such as dicyclopentanyl(meth)acrylate, dicyclopentanyloxyethyl(meth)acrylate, tricyclopentanyl(meth)acrylate, 1-adamantyl(meth)acrylate, 2-methyl-2-adamantyl(meth)acrylate, 2-ethyl-2-adamantyl(meth)acrylate etc., and the like. The above-mentioned alicyclic monomer can be used alone, or two or more kinds thereof may be used in combination.

As the above-mentioned alicyclic monomer, cyclohexyl acrylate (CHA) (Tg of homopolymer: 15° C.), cyclohexyl methacrylate (CHMA) (Tg of homopolymer: 66° C.), isobornyl acrylate (IBXA) (Tg of homopolymer: 97° C.) or isobornyl methacrylate (IBXMA) (Tg of homopolymer: 173° C.) is preferable.

While the glass transition temperature (Tg) of the homopolymer formed from the above-mentioned alicyclic monomers is not particularly limited, it is preferably 60-190° C., more preferably 60-150° C., further preferably 60-120° C., to improve processability of the double-faced adhesive sheet of the present invention by increasing the glass transition temperature of acrylic polymer (X). The above-mentioned glass transition temperature (Tg) of formed homopolymer is sometimes referred to as "Tg of homopolymer".

As the Tg of homopolymers of monomers other than the above-mentioned cyclohexyl acrylate (CHA), cyclohexyl methacrylate (CHMA), isobornyl acrylate (IBXA) and isobornyl methacrylate (IBXMA), the numerical values described in "Polymer Handbook" (3rd ed., John Wiley & Sons, Inc, 1989) can be adopted. Furthermore, as the Tg of homopolymers of monomers other than cyclohexyl acrylate, cyclohexyl methacrylate, isobornyl acrylate and isobornyl methacrylate, which is not described in the above-mentioned document, for example, a value obtained by the following measurement method (see JP-A-2011-099078) can be adopted.

(Measurement Method)

A monomer (100 parts by weight), 2,2'-azobisisobutyronitrile (0.2 parts by weight) and ethyl acetate (200 parts by weight) as a polymerization solvent are poured into a reactor provided with a thermometer, a stirrer, a nitrogen inlet tube and a reflux condenser, and the mixture is stirred for 1 hr while introducing nitrogen gas. After removing oxygen in the polymerization system in this way, the mixture is heated to 63° C. and reacted for 10 hr. Then, the mixture is cooled to room temperature to give a homopolymer solution having a solid concentration of 33 wt %. The homopolymer solution is cast coated on a separator and dried to produce a test sample having a thickness of about 2 mm (sheet-shaped homopolymer). This test sample is punched out in a disk having a diameter of 7.9 mm, and sandwiched between parallel plates. Using a viscoelasticity tester (manufactured by ARES, Rheometric), viscoelasticity is measured in a shear mode while applying a shear distortion at 1 Hz frequency in a temperature region of −70 to 150° C. at a temperature raising rate of 5° C./min, and the peak top temperature of tan δ is taken as Tg of homopolymer.

In view of the processability of acrylic adhesive sheet (A), the content of the above-mentioned alicyclic monomer in the total monomer components forming the acrylic polymer (X) is preferably 0.5 wt % or more and less than 10 wt %, more preferably 1-8 wt %, relative to the total amount (100 wt %) of the monomer components forming the acrylic polymer (X). Use of an alicyclic monomer is preferable since it increases the glass transition temperature of acrylic polymer (X) and improves the strength and processability of acrylic adhesive sheet (A). The above-mentioned content is particularly preferably 0.5 wt % or more, since the processability can be improved easily. In addition, the above-mentioned content is preferably less than 10 wt %, since reworkability (removability) of the acrylic adhesive sheet (A) on (from) a optical element can be improved.

Examples of the above-mentioned multifunctional monomer (polyfunctional monomer) include hexanediol di(meth)acrylate, butanediol di(meth)acrylate, (poly)ethylene glycol di(meth)acrylate, (poly)propylene glycol di(meth)acrylate, neopentylglycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, vinyl(meth)acrylate, divinylbenzene, epoxyacrylate, polyester acrylate, urethane acrylate and the like. Of these, hexanediol diacrylate (HDDA) is preferable in view of level difference absorbability. The above-mentioned multifunctional monomer can be used alone, or two or more kinds thereof may be used in combination.

While the content of the above-mentioned multifunctional monomer in the total monomer components forming the acrylic polymer (X) is not particularly limited, it is preferably 0.001-0.3 wt %, more preferably 0.005-0.2 wt %, further preferably 0.01-0.1 wt %, relative to the total amount (100 wt %) of the monomer components forming the acrylic polymer (X) to control the gel fraction of acrylic adhesive sheet (A) within a preferable range. The above-mentioned content of 0.3 wt % or less is preferable, since it prevents the gel fraction of acrylic adhesive sheet (A) from becoming too high and easily improves reworkability. In addition, the above-mentioned content of 0.001 wt % or more is preferable, since it prevents the gel fraction of acrylic adhesive sheet (A) from becoming too low, and can easily improve resistance to foaming delamination and processability. When a crosslinking agent is used, the above-mentioned multifunctional monomer may not be used, but when a crosslinking agent is not used, a multifunctional monomer is particularly preferably used within the above-mentioned content range.

As the monomer components forming the above-mentioned acrylic polymer (X), the above-mentioned $C_{1-14}$ alkyl (meth)acrylate, polar group-containing monomers, alicyclic monomers, multifunctional monomers, and monomers other than the above monomers (other monomers) may be used. Examples of other monomers include alkyl(meth)acrylate containing a straight chain or branched chain alkyl group having 15-20 carbon atoms ($C_{15-20}$ alkyl(meth)acrylate) such as pentadecyl(meth)acrylate, hexadecyl(meth)acrylate, heptadecyl(meth)acrylate, octadecyl(meth)acrylate, nonadecyl(meth)acrylate, eicosyl(meth)acrylate and the like; (meth)acrylic acid ester containing an aromatic hydrocarbon group such as phenyl(meth)acrylate, phenoxyethyl(meth)acrylate (0), benzyl(meth)acrylate and the like; the aforementioned $C_{1-14}$ alkyl(meth)acrylate such as alkoxyalkyl(meth)acrylate monomer [methoxyethyl(meth)acrylate, ethoxyethyl(meth)acrylate etc.] and the like, polar group-containing monomers, alicyclic monomers, multifunctional monomers, and monomers other than the above monomers. In addition, vinyl esters such as vinyl acetate, vinyl propionate and the like; aromatic vinyl compounds such as styrene, vinyltoluene and the like; olefins or dienes such as ethylene, butadiene, isoprene, isobutylene and the like; vinyl ethers such as vinyl alkyl ether and the like; vinyl chloride and the like can be recited. The above-mentioned other monomers can be used alone, or two or more kinds thereof may be used in combination.

The above-mentioned acrylic polymer (X) can be prepared by polymerizing the above-mentioned monomer components according to a known polymerization method conventionally used. Examples of the polymerization method of acrylic polymer (X) include solution polymerization method, emulsion polymerization method, bulk polymerization method, polymerization method by irradiation of activation energy line (activation energy line polymerization method) and the like. From the aspects of transparency, water resistance, cost and the like, solution polymerization method and activation energy line polymerization method are preferable. Furthermore, activation energy line polymerization method is particularly preferable, since an acrylic adhesive layer having a comparatively large thickness can be formed easily. That is, the above-mentioned acrylic polymer (X) is preferably an acrylic polymer formed by activation energy line polymerization.

Examples of the activation energy line to be irradiated for the above-mentioned activation energy line polymerization (photopolymerization) include ionizing radiation such as $\alpha$-ray, $\beta$-ray, $\gamma$-ray, neutron ray, electron ray and the like, UV and the like, and UV is particularly preferable. The irradiation energy, irradiation time, irradiation method and the like of the activation energy line are not particularly limited as long as it can activate a photopolymerization initiator to cause reaction of monomer components.

For the above-mentioned solution polymerization, various general solvents can be used. Examples of such solvent include organic solvents such as esters (ethyl acetate, n-butyl acetate and the like); aromatic hydrocarbons (toluene, benzene and the like); aliphatic hydrocarbons (n-hexane, n-heptane and the like); alicyclic hydrocarbons (cyclohexane, methylcyclohexane and the like); ketones (methylethyl ketone, methylisobutylketone and the like) and the like. The above-mentioned solvents can be used alone, or two or more kinds thereof may be used in combination.

For the preparation of the above-mentioned acrylic polymer (X), polymerization initiators such as a photopolymerization initiator (photoinitiator), a thermal polymerization initiator and the like can be used according to the kind of the polymerization reaction. The above-mentioned polymerization initiator can be used singly, or two or more kinds thereof can be used in combination.

While the above-mentioned photopolymerization initiator is not particularly limited, for example, benzoin ether photopolymerization initiator, acetophenone photopolymerization initiator, $\alpha$-ketol photopolymerization initiator, aromatic sulfonylchloride photopolymerization initiator, photoactive oxime photopolymerization initiator, benzoin photopolymerization initiator, benzyl photopolymerization initiator, benzophenone photopolymerization initiator, ketal photopolymerization initiator, thioxanthone photopolymerization initiator can be recited. The amount of the photopolymerization initiator to be used is not particularly limited and, for example, it is preferably 0.01-1 part by weight, more preferably 0.05-0.5 parts by weight, relative to 100 parts by weight of the total amount of the monomer components forming acrylic polymer (X).

Examples of the above-mentioned benzoinether photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one, anisole methyl ether and the like. Examples of the above-mentioned acetophenone photopolymerization initiator include 2,2-diethoxyacetophenone, 2,2-dimethoxy-2-phenylacetophenone, 1-hydroxycyclohexyl phenyl ketone, 4-phenoxy dichloroacetophenone, 4-(t-butyl)dichloroacetophenone and the like. Examples of the above-mentioned $\alpha$-ketol photopolymerization initiator include 2-methyl-2-hydroxypropiophenone, 1-[4-(2-hydroxyethyl)phenyl]-2-methylpropan-1-one and the like. Examples of the above-mentioned aromatic sulfonylchloride photopolymerization initiator include 2-naphthalenesulfonyl chloride and the like. Examples of the above-mentioned photoactivity oxime photopolymerization initiator include 1-phenyl-1,1-propanedion-2-(o-ethoxycarbonyl)-oxime and the like. Examples of the above-mentioned benzoin photopolymerization initiator include benzoin and the like. Examples of the above-mentioned benzyl photopolymerization initiator include benzyl and the like. Examples of the above-mentioned benzophenone photopolymerization initiator include benzophenone, benzoylbenzoic acid, 3,3'-dimethyl-4-methoxybenzophenone, polyvinyl benzophenone, $\alpha$-hydroxycyclohexyl phenyl ketone and the like. Examples of the above-mentioned ketal photopolymerization initiator include benzyl dimethyl ketal and the like. Examples of the above-mentioned thioxanthone photopolymerization initiator include thioxanthone, 2-chlorothioxanthone, 2-methylthioxanthone, 2,4-dimethylthioxanthone, isopropylthioxanthone, 2,4-diisopropylthioxanthone, dodecylthioxanthone and the like.

Examples of the polymerization initiator to be used for polymerizing the above-mentioned acrylic polymer (X) by solution polymerization include azo polymerization initiators, peroxide polymerization initiators (e.g., dibenzoyl peroxide, tert-butyl permaleate and the like), redox polymerization initiators and the like. Of these, the azo polymerization initiator disclosed in JP-A-2002-69411 is preferable. Examples of the above-mentioned azo polymerization initiator include 2,2'-azobisisobutyronitrile (hereinafter sometimes to be referred to as AIBN), 2,2'-azobis-2-methylbutyronitrile (hereinafter sometimes to be referred to as AMBN), 2,2'-azobis(2-methylpropionic acid)dimethyl, 4,4'-azobis(4-cyanovaleric acid) and the like. The amount of the above-mentioned azo polymerization initiator to be used is preferably 0.05-0.5 parts by weight, more preferably 0.1-0.3 parts by weight, relative to 100 parts by weight of the total amount of monomer components forming acrylic polymer (X).

From the aspect of adhesive property and the like, the content of the acrylic polymer (X) in the acrylic adhesive sheet (A) is preferably 50 wt % or more (50-100 wt %), more preferably 65-100 wt %, further preferably 70-99.9 wt %, relative to 100 wt % of the acrylic adhesive sheet (A).

The acrylic adhesive sheet (A) preferably contains a silane coupling agent to improve adhesive force (particularly, adhesive force to glass). While the silane coupling agent is not particularly limited, γ-glycidoxypropyltrimethoxysilane, γ-glycidoxypropyltriethoxysilane, γ-aminopropyltrimethoxysilane, N-phenyl-aminopropyltrimethoxysilane and the like can be mentioned. Of these, γ-glycidoxypropyltrimethoxysilane is preferable. As the above-mentioned silane coupling agent, commercially available products such as trade name "KBM-403" (manufactured by Shin-Etsu Chemical Co., Ltd.) and the like may be used. The above-mentioned silane coupling agent can be used alone, or two or more kinds thereof may be used in combination.

While the content of the above-mentioned silane coupling agent in acrylic adhesive sheet (A) is not particularly limited, it is preferably 0.01-2 parts by weight, more preferably 0.03-1 part by weight, still more preferably 0.03-0.5 parts by weight, per 100 parts by weight of the total amount of the monomer component forming acrylic polymer (X). When a silane coupling agent is contained, an adhesive force (particularly adhesive force to glass) is improved with time. Therefore, for example, the adhesive force is comparatively small and rework is easy immediately after adhesion of optical elements via acrylic adhesive sheet (A) (i.e., immediately after production of the product), and the adhesive force becomes high after lapse of a long time from the completion of the adhered product and adhesion reliability increases (properties of sufficient adhesive force, resistance to foaming delamination). Hence, the above content is preferable since it simultaneously achieves reworkability and adhesion reliability. The above-mentioned content of not less than 0.01 part by weight is preferable since the above-mentioned effect of adhesion reliability can be easily achieved. The content of not more than 2 parts by weight is preferable since the reworkability is improved. With no particular limitation, when the above-mentioned silane coupling agent is not used, a polar group containing monomer may be used as a monomer component that forms acrylic polymer (X), since the adhesive force is further improved.

The acrylic adhesive sheet (A) may also contain known additives as necessary such as crosslinking agent, crosslinking promoter, tackifying resin (rosin derivative, polyterpene resin, petroleum resin, oil-soluble phenol etc.), anti-aging agent, filler, colorant (pigment, dye etc.), UV absorber, antioxidant, chain-transfer agent, plasticizer, softener, surfactant, antistatic agent and the like as long as it is within the range that does not impair the effect of the present invention.

Examples of the above-mentioned crosslinking agent include isocyanate crosslinking agent, epoxide crosslinking agent, melamine crosslinking agent, peroxide crosslinking agent, urea crosslinking agent, metal alkoxide crosslinking agent, metal chelate crosslinking agent, metal salt crosslinking agent, carbodiimide crosslinking agent, oxazoline crosslinking agent, aziridine crosslinking agent, amine crosslinking agent and the like. Of these, isocyanate crosslinking agent and epoxide crosslinking agent are preferable. The above-mentioned crosslinking agent can be used alone, or two or more kinds thereof may be used in combination.

Examples of the above-mentioned isocyanate crosslinking agent (multifunctional isocyanate compound) include lower aliphatic polyisocyanates such as 1,2-ethylenediisocyanate, 1,4-butylenediisocyanate, 1,6-hexamethylenediisocyanate and the like; alicyclic polyisocyanates such as cyclopentylenediisocyanate, cyclohexylenediisocyanate, isophoronediisocyanate, hydrogenated tolylenediisocyanate, hydrogenated xylenediisocyanate and the like; aromatic polyisocyanates such as 2,4-tolylenediisocyanate, 2,6-tolylenediisocyanate, 4,4'-diphenylmethanediisocyanate, xylylenediisocyanate etc., and the like. In addition, trimethylolpropane/tolylenediisocyanate adduct [manufactured by Nippon Polyurethane Industry Co., Ltd., trade name "CORONATEL"], trimethylolpropane/hexamethylenediisocyanate adduct [manufactured by Nippon Polyurethane Industry Co., Ltd., trade name "CORONATEHL"] and the like can also be used.

Examples of the above-mentioned epoxide crosslinking agent (multifunctional epoxy compound) include N,N,N',N'-tetraglycidyl-m-xylenediamine, diglycidyl aniline, 1,3-bis(N,N-diglycidyl aminomethyl)cyclohexane, 1,6-hexanediol-diglycidyl ether, neopentylglycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl-tris(2-hydroxyethyl)isocyanurate, resorcin diglycidyl ether, bisphenol S diglycidyl ether, epoxide resin containing two or more epoxy groups in a molecule and the like. As a commercially available product, trade name "TETRADC" manufactured by MITSUBISHI GAS CHEMICAL COMPANY, INC. can be used.

When the above-mentioned crosslinking agent is used, the content thereof in the acrylic adhesive sheet (A) is not particularly limited. For example, it is preferably 0.01-1 part by weight, more preferably 0.01-0.8 parts by weight, relative to 100 parts by weight of the total amount of monomer components forming the acrylic polymer (X), to control the gel fraction of the acrylic adhesive sheet (A) to fall within the preferable range.

The gel fraction of acrylic adhesive sheet (A) is 20-75 wt %, preferably 40-75 wt %, more preferably 50-75 wt %, still more preferably 50-74 wt %. When the above-mentioned gel fraction is not more than 75 wt %, the cohesion strength of acrylic adhesive sheet (A) decreases to some extent and acrylic adhesive sheet (A) becomes soft. As a result, acrylic adhesive sheet (A) easily suffers from cohesive failure due to a shear stress during separation of adherends. Thus, adherends can be easily separated, and reworkability increases. Moreover, acrylic adhesive sheet (A) easily follows difference in level and improves level difference absorbability. On the other hand, when the above-mentioned gel fraction is not less than 20 wt %, acrylic adhesive sheet (A) is prevented from being too soft, whereby processability and resistance to foaming delamination can be improved. When the above-mentioned gel fraction is less than 20 wt %, acrylic adhesive sheet (A) becomes too soft and processability decreases. For example, an adhesive may attach to the blade, acrylic adhesive sheet (A) may be deformed on adhesion to an adherend and an adhesive may protrude from the end portion of an adherend to result in, so-called "glue extrusion", during cut processing of acrylic adhesive sheet (A). Also, delamination easily occurs under a high temperature environment and high temperature high humidity environment, which degrades resistance to foaming delamination. The above-mentioned gel fraction can be controlled by the kind and content (amount of use) of the multifunctional monomer and/or crosslinking agent and the like.

The above-mentioned gel fraction (proportion of solvent insoluble substance) can be obtained as an ethyl acetate insoluble content. Specifically, it is determined as a weight fraction (unit: wt %) of solvent insoluble substance after immersion of a sample (acrylic adhesive sheet (A)) in ethyl acetate at room temperature (23° C.) for 7 days to the acrylic adhesive sheet (A) before immersion. More specifically, the above-mentioned gel fraction is a value calculated by the following "measurement method of gel fraction".
(Measurement Method of Gel Fraction)

Acrylic adhesive sheet (A): about 0.1 g is obtained from the double-faced adhesive sheet of the present invention, wrapped with a porous tetrafluoroethylene sheet having an average pore size of 0.2 μm (trade name "NTF1122", manufactured by NITTO DENKO CORPORATION), and tied with a kite string. The weight at that time is measured and taken as the weight before immersion. The weight before immersion is the total weight of the acrylic adhesive sheet (A) (acrylic adhesive sheet (A) obtained above), the tetrafluoroethylene sheet and the kite string. In addition, the total weight of the tetrafluoroethylene sheet and kite string is also measured, and taken as the package weight.

Then, the acrylic adhesive sheet (A) wrapped with a tetrafluoroethylene sheet and bound with a kite string (to be referred to as "sample") is placed in a 50 ml container filled with ethyl acetate, and left standing at 23° C. for 1 week (7 days). Thereafter, the sample (after ethyl acetate treatment) is taken out from the container, and placed in an aluminum cup. After drying in a drying machine at 130° C. for 2 hr to remove ethyl acetate, the weight is measured, and the weight is taken as the weight after immersion.

Then, the gel fraction is calculated from the following formula.

$$\text{gel fraction(wt \%)}=(A-B)/(C-B)\times 100$$

(wherein A is a weight after immersion, B is a package weight, and C is a weight before immersion.)

The acrylic adhesive sheet (A) may be formed by a known or conventional method for forming an adhesive layer. While the method for forming acrylic adhesive sheet (A) varies depending on the polymerization method of acrylic polymer (X) and the like and is not particularly limited, for example, the following methods (1)-(3) and the like can be mentioned. (1) An acrylic adhesive composition containing a mixture of monomer components forming acrylic polymer (X) (monomer mixture) or a partial polymer substance thereof, a photopolymerization initiator and, where necessary, a silane coupling agent and various additives is applied (coated) to a substrate or separator, and activation energy line (particularly, UV is preferable) is irradiated (i.e., activation energy line curing) to form an acrylic adhesive sheet (A). (2) An acrylic adhesive composition (solution) containing acrylic polymer (X), a solvent and, where necessary, a silane coupling agent, a crosslinking agent and various additives is applied (coated) to a substrate or separator, and dried and/or cured to form acrylic adhesive sheet (A). (3) The acrylic adhesive sheet (A) formed in the above-mentioned (1) is further dried.

For application (coating) in the above-mentioned formation method of acrylic adhesive sheet (A), a known coating method can be used, and a conventional coater such as gravure roll coater, reverse roll coater, kiss-roll coater, dip roll coater, bar coater, knife coater, spray coater, comma coater, direct coater and the like can be used.

The content of the photopolymerization initiator, silane coupling agent and crosslinking agent in the above-mentioned acrylic adhesive composition is preferably within the range described as the content of each component in the aforementioned acrylic adhesive sheet (A) (content relative to 100 parts by weight of the total amount of monomer components forming acrylic polymer (X)).

As a solvent for the above-mentioned formation method of the acrylic adhesive sheet (A), various conventional solvents can be used. The above-mentioned solvent is not particularly limited, and those exemplified as solvents used for the aforementioned solution polymerization of acrylic polymer (X) and the like can be used. The above-mentioned solvent can be used alone, or two or more kinds thereof may be used in combination.

The thickness of the acrylic adhesive sheet (A) is preferably 10-1000 μm, more preferably 100-500 μm, further preferably 150-350 μm. When the thickness is 10 μm or more, a cohesive failure due to a shear stress occurs more easily when the optical laminate is subjected to step 4.

While the procedure to produce an optical laminate is not particularly limited, one example is the following procedure.

First, one adhesive surface of a double-faced adhesive sheet is adhered to one optical element with a hand roller, the other adhesive surface of the double-faced adhesive sheet is adhered to the other optical element, the two optical elements are adhered to each other and further subjected to an autoclave treatment.

While the adhesion conditions vary depending on the kind of the optical element, adhesive sheet and the like, they are generally area pressure: 0.05-0.7 MPa, vacuum degree: 10-3000 Pa, and treatment time: 3-20 sec.

The autoclave treatment is a treatment for releasing air bubbles present in the laminate to the outside of the laminate. While the treatment conditions vary depending on the kind of the optical element, adhesive sheet and the like, they are generally temperature: 20-70° C., pressure: 0.2-0.8 MPa, and treatment time: 10-120 min.

[Step 2]

In this step, the appearance of the optical laminate obtained in step 1 is checked.

While the check items of the appearance check vary depending on the kind of the optical laminate, the appearance such as the presence of air bubbles, foreign substance, cord, wrinkles, color change and the like, adhesion position of the two optical elements, and the like are generally examined.

As the check method, a visual test under a fluorescent light (reflection, permeation method), a microscopic check under a microscope and the like, a check of spot light source and the like are performed. The place of the test is generally under light or in a dark room.

[Step 3]

In this step, a flat panel display is assembled using the optical laminate that passed the check of step 2.

That is, for example, when the optical laminate contains a display panel, they are assembled in a given frame together with a back light, a substrate (circuit substrate) and the like. In addition, for example, when a flat panel display is assembled using an optical laminate wherein a touch panel and a transparent protection plate are adhered, such optical laminate is assembled together with a display panel, a back light, a substrate (circuit substrate) and the like in a given frame. The optical laminate used for the step of assembling a flat panel display is not always one kind and two or more kinds of optical laminates are sometimes used.

[Step 4]

In this step, two optical elements in an optical laminate that was rejected by the check in step 2 are relatively rotated with the vertical line penetrating the opposing faces thereof as a rotation axis, whereby two optical elements are separated.

Figure 2:
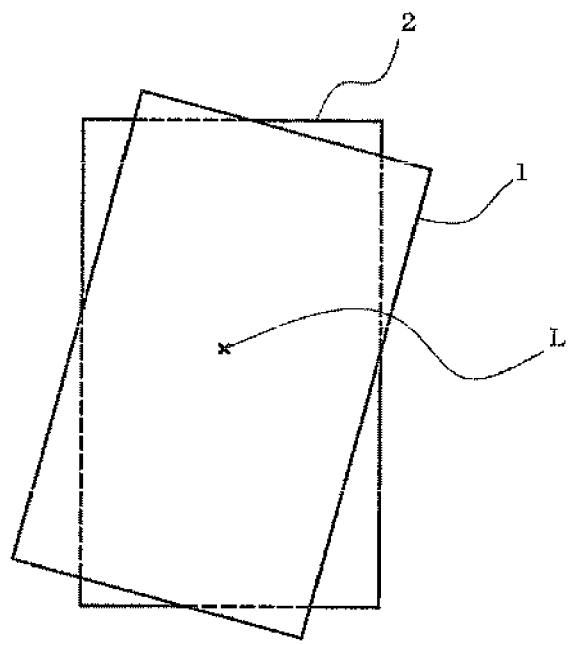
FIG. 2 is a plane view schematically showing relative rotation of two optical elements, which is performed when separating the two optical elements in the optical laminate in step 4 of the method of the present invention.

FIG. 2 is a plane view schematically showing relative rotation of the two optical elements. In the Figure, symbol L is a rotation axis which is a vertical line penetrating opposing surfaces of two optical elements 1, 2, and the two optical elements 1, 2 rotate relatively about the rotation axis L. The position of the rotation axis L in the opposing surfaces of optical elements 1, 2 is not particularly limited. However, to reduce the kinetic load applied to the optical elements during rotation, the center of gravity (center) or vicinity thereof in the opposing surfaces of two optical elements 1, 2 is preferable. The vicinity means region at a distance within 30 mm (preferably within 15 mm) from the center of gravity (center).

The relative rotation of two optical elements may be an accelerating rotation wherein the rotating speed is continuously increased from the start of the rotation, or an embodiment wherein the initial motion is accelerated rotation, followed by substantially constant-speed rotation after the rotating speed of the two optical elements has reached an operating speed producing a shear stress effective for causing rupture of the adhesive sheet or curable resin layer (hereinafter to be also referred to as "charging speed"). In the context of the present invention, the "initial motion" in the relative rotation of two optical elements means an accelerating time necessary for the rotating speed of the two optical elements to reach the charging speed, which is preferably within about 1 second, more preferably within about 0.5 second, from the start of the rotation. In addition, "the rotating speed is substantially at a constant speed" means a concept including continuous rotation at a predetermined rotating speed (standard) with a minor speed change within ±0.01 (degrees/sec). For example, "constant speed rotation at rotating speed of A (degrees/sec)" means rotation at a rotating speed in the range of (A−0.01)(degrees/sec)−(A+0.01)(degrees/sec).

Furthermore, "rupture" means at least a partial destruction of an adhesive sheet or curable resin layer.

The relative rotation of the two optical elements is performed by accelerated rotation wherein the rotation speed is continuously increased from the start of the rotation, and the rotation speed can be increased as long as it does not exceed 50 (degrees/sec).

In addition, when the relative rotation of the two optical elements includes accelerated rotation in the initial motion followed by substantially constant speed rotation, the accelerated rotation in the initial motion is preferably performed within 1 sec, more preferably within 0.5 sec. The acceleration in the initial motion is preferably less than 30000 (degrees/sec$^2$), more preferably not more than 25000 (degrees/sec$^2$), yet more preferably not more than 20000 (degrees/sec$^2$), still more preferably not more than 15000 (degrees/sec$^2$), especially preferably not more than 10000 (degrees/sec$^2$), particularly preferably not more than 5000 (degrees/sec$^2$), and most preferably not more than 3000 (degrees/sec$^2$). By setting the acceleration to less than 30000 (degrees/sec$^2$), the damage on the optical elements can be reduced.

The rotating speed of the two optical elements after the initial motion (i.e., charging speed) is preferably not less than 0.01 (degrees/sec), more preferably not less than 1 (degrees/sec). In general, when the rotating speed is too high, optical elements are easily damaged. Thus, the rotating speed is preferably less than 50 (degrees/sec), more preferably less than 30 (degrees/sec), more preferably not more than 25 (degrees/sec), still more preferably not more than 20 (degrees/sec), yet more preferably not more than 20 (degrees/sec), particularly preferably not more than 18 (degrees/sec). The "rotating speed" here means, when only one of the two optical elements is rotated in relative rotation of two optical elements, the rotating speed of the rotating optical element and, when both of the two optical elements are rotated (when one optical element and the other optical element are rotated in opposite directions), the total of the rotating speeds of the two optical elements. The rotation of two optical elements after the initial motion is preferably constant-speed rotation to reduce damage on the optical elements due to rapid changes of torque.

In the present invention, the rotation angle in the relative rotation of the two optical elements is preferably not more than 90 degrees, more preferably not more than 60 degrees, and particularly preferably not more than 30 degrees. Depending on the rotation speed of the optical element, a rotation angle of not more than 90 degrees can shorten the time of optical element separation work. The rotation angle is preferably not less than 5 degrees. When the rotation angle is not less than 5 degrees, an adhesive sheet or curable resin layer is certainly subject to a shear stress due to the rotation, which reduces the load on the two optical elements produced by the shift of the optical elements in parallel thereafter.

The relative rotation of two optical elements can be performed such that an adhesive sheet or curable resin layer is subject to a shear stress, which sufficiently reduces the cohesive force thereof. The rotation is generally performed until at least an adhesive sheet or curable resin layer is ruptured. The relative rotation divides the adhesive sheet or curable resin layer. That is, the adhesive sheet or curable resin layer is physically divided into two or more to separate the two optical elements. Alternatively, after relative rotation of the two optical elements, the two optical elements may be relatively moved in parallel to each other to divide the adhesive sheet or curable resin layer, thus separating the two optical elements.

By the "two optical elements may be relatively moved in parallel" is meant moving at least one of the two optical elements, which are adhered via an adhesive sheet or a curable resin layer, while maintaining the distance between opposing surfaces of the two optical elements substantially the same. The "two optical elements may be relatively moved in parallel" includes rotating at least one of the two optical elements about a rotation axis present outside a laminate of the two optical elements, where at least one of the two optical elements is preferably moved linearly, since it shortens the time of separation work of the two optical elements. When at least one of the two optical elements is moved linearly, it is more preferable to move at least one of the two optical elements such that one of the optical elements and the other optical element are being separated toward opposite directions forming an angle of 180 degrees, since it shortens the time of separation work of the two optical elements. While the moving speed of the optical element in parallel shift of the two optical elements is not particularly limited, 150-500 (mm/sec) is preferable, and 300-500 (mm/sec) is more preferable.

An adhesive sheet or curable resin layer subject to a shear stress produced by relative rotation of the two optical elements has decreased cohesive force. Thus, when the two optical elements are moved relatively parallel, the adhesive sheet or curable resin layer is divided into a part adhered to one optical element and a part adhered to the other optical element, whereby separation of the two places is more rapidly completed.

FIG. 3(A) and FIG. 3(B) are schematic showings of one embodiment of an automatic apparatus used to practice step 4, wherein FIG. 3(A) is a front view, and FIG. 3(B) is a side view seen from the direction of arrow A in FIG. 3(A). In optical laminate 4 wherein two optical elements 1, 2 are adhered to each other via an adhesive sheet or curable resin layer 3, one of the optical elements 1 is fixed to the first jig 6 via a double-faced adhesive sheet 5, and the other optical element 2 is fixed by being inserted into a frame 7, which restrains move in the horizontal direction of the optical element 2, of the second jig 9 formed on the surface of pedestal 8. Here, the frame 7 is a U-shaped (flat plane) frame following the three sides of the rectangular optical element 2.

The first jig 6 is connected to a drive apparatus 10 such as a servomotor and the like and rotatably supported. When the first jig 6 is rotated by the drive apparatus 10, optical element 1 is rotated while optical element 2 is fixed by the second jig 9, thereby relative rotating the two optical elements. The drive apparatus 10 is connected to a microcomputer (not shown), and the rotating speed, rpm angle and the like of the first jig 6 are controlled by the microcomputer.

The second jig 9 is mounted on a conveyor (not shown) and, after relative rotation of two optical elements, the second jig 9 linearly moves in the direction of arrow X in FIG. 3(A) at a constant speed. As a result of the shift of the second jig 9, the adhesive sheet or curable resin layer 3 is divided into a part adhered to one optical element 1 and a part adhered to the other optical element 2, whereby separation of the two optical elements 1, 2 is completed (FIG. 4).

The period of operation of the relative rotation and the linear movement after relative rotation of the two optical elements and the timing of the movement are controlled by a microcomputer based on a program previously set. When an operator sets an optical laminate 4 on jigs 6, 9, the separation operation of the two optical elements is automatically performed.

The torque tends to decrease when an optical laminate wherein two optical elements are adhered to each other via an adhesive sheet or curable resin layer is subjected to relative rotation of the two optical elements in a heated state, and the method of the present invention can be performed while heating an laminate wherein two optical elements are adhered to each other via an adhesive sheet or curable resin layer. For heating, generally, the laminate is preferably heated to 30-100° C., more preferably 50-80° C., though it varies depending on the kind of two optical elements constituting the optical laminate, and an adhesive sheet or curable resin layer.

[Double-Faced Adhesive Sheet for Fixing Optical Elements to Jig]

In the present invention, as a double-faced adhesive sheet to be used for fixing an optical element, which is a laminate wherein two optical elements are adhered to each other via an adhesive sheet or curable resin layer, to a jig, a heat releasable double-faced adhesive sheet (double-faced adhesive sheet having a pressure-sensitive adhesive layer by a releasable pressure-sensitive adhesive that adheres by pressurization and expresses removability by applying heat after adhesion), ultraviolet curing releasable double-faced adhesive sheet (that is, double-faced adhesive sheet having, on both surfaces of a support substrate, a pressure-sensitive adhesive layer by a releasable pressure-sensitive adhesive (acrylic, urethane and the like) that adheres by pressurization and expresses removability by being cured by UV irradiation after adhesion) and the like are used. Among the optical elements provided on the display surface side of a flat panel display, a surface protection optical element that protects the surface of a display panel and the like mostly have one surface thereof subjected to an antifouling treatment. Specific examples of the surface subjected to an antifouling treatment include those treated with known fluorine antifouling agents, known silicone antifouling agents and the like described in JP-A-9-157582, JP-A-11-217558, JP-A-2000-144097, JP-A-2005-290323, JP-A-2007-145884, JP-A-2008-156454, JP-A-2005-54029, JP-A-2008-88323, JP-A-2006-124417, JP-A-9-157582 and the like. Such surface subjected to an antifouling treatment resists adhesion of an adhesive. In this step, therefore, when at least one of the protection optical elements in an optical laminate wherein two optical elements are adhered to each other via an adhesive sheet or curable resin layer has a surface resisting adhesion of an adhesive, such as a surface subjected to an antifouling treatment, the following silicone adhesive sheet or porous adhesive sheet is preferably used as a double-faced adhesive sheet to be used for fixing the optical element to a jig.

<Silicone Pressure-Sensitive Adhesive Sheet>

Said silicone pressure-sensitive adhesive sheet is a pressure-sensitive adhesive sheet having at least an adhesive layer made of a silicone adhesive (hereinafter to be also referred to as "silicone adhesive layer"), and specific examples thereof include double-faced pressure-sensitive adhesive sheet made of a silicone adhesive layer alone, a pressure-sensitive adhesive sheet having a silicone adhesive layer on one side of a substrate, a double-faced pressure-sensitive adhesive sheet having a silicone adhesive layer on either side of a substrate, and a double-faced pressure-sensitive adhesive sheet having a silicone adhesive layer on one side of a substrate and an adhesive layer made of an adhesive other than the silicone adhesive on the other side of the substrate.

Examples of the substrate of the silicone pressure-sensitive adhesive sheet include film substrates of poly(ethylene terephthalate), poly(butylene terephthalate), poly(ethylene naphthalate), polyethylene, polypropylene and the like, non-woven fabric using Manila hemp, rayon, polyester, pulp fiber and the like as a starting material, paper, a porous material and the like.

As the silicone adhesive of the silicone pressure-sensitive adhesive sheet 5, various silicone rubbers containing polydiorganosiloxane as a constituent component can be used without particular limitation. Examples of the organic group of polydiorganosiloxane include hydrocarbon groups such as alkyl group, aryl group, alkenyl group and the like. Examples of the alkyl group include methyl, ethyl, propyl and the like and methyl group is preferably used from the aspects of adhesive property, durability and the like. Examples of the aryl group include phenyl group and the like. When an addition reaction is used for crosslinking the silicone adhesive, an alkenyl group is preferably copolymerized. Examples of the alkenyl group include vinyl group, allyl group, butenyl group, hexenyl group and the like. Of these, vinyl group is preferably used. In addition, various functional groups such as hydroxyl group and the like may be introduced. Particularly, one having a hydroxyl group on both terminals can be preferably used. Examples of the polydiorganosiloxane include polydimethyl siloxane, polydiphenylsiloxane and a copolymer thereof, a mixture thereof and the like.

Of such polydiorganosiloxane, polydiorganosiloxane having a phenyl group in a molecule is preferable. While the content of the phenyl group is not particularly limited, its ratio to the organic group bonded to the silicon atom that polydiorganosiloxane has (ratio of the number of phenyl groups to the total number of organic groups) is preferably about 5-200, more preferably about 7-18%.

While the degree of polymerization of polydiorganosiloxane is not particularly limited, it is generally preferably 500-10000, more preferably 2000-8000. One or more kinds of such polydiorganosiloxane can be used in an appropriate combination.

Polydiorganosiloxane may appropriately contain various silicone resins used for silicone adhesives. Silicone adhesives are used in the form of a partial condensate or mixture of the aforementioned silicone rubber and a silicone resin. The silicone resin is branched polyorganosiloxane containing a hydroxyl group bonded to the silicon atom in a molecule. Using the hydroxyl group, a partial condensation reaction can be performed with the aforementioned silicone rubber. For example, polyorganosiloxane comprised of a copolymer having at least one kind of unit selected from Munit ($R_3SiO_{1/2}$), Qunit ($SiO_2$), Tunit ($RSiO_{3/2}$) and Dunit ($R_2SiO$) (in the aforementioned unit, R is a monovalent hydrocarbon group or hydroxyl group) can be preferably used. Examples of the monovalent hydrocarbon group include alkyl group such as methyl group, ethyl group and propyl group, alkenyl group such as vinyl group and the like, and aryl group such as phenyl group and the like.

The aforementioned polyorganosiloxane comprised of a copolymer has a hydroxyl group, and may be introduced as necessary with various functional groups such as vinyl group and the like. The functional group to be introduced may cause a crosslinking reaction. As the aforementioned copolymer, MQ resin comprised of Mu nit and Q unit is preferable.

While the ratio (molar ratio) of Munit and Qunit, Tunit or Dunit is not particularly limited, the former:the latter=about 0.3:1-1.5:1, preferably about 0.5:1-1.3:1. One or more kinds of such silicone resins can be used in an appropriate combination.

While the content ratio (ratio of weight) of the aforementioned silicone rubber and silicone resin is not particularly limited, preferably 60-250 parts by weight, more preferably 80-200 parts by weight, of the silicone resin is used relative to 100 parts by weight of the silicone rubber. The silicone rubber and silicone resin may be used in combination or partial condensates thereof may be used.

The silicone adhesive may be a crosslinked structure. As the crosslinking agent, a peroxide crosslinking agent, or a siloxane crosslinking agent having an SiH group is preferable. The peroxide crosslinking agent affords crosslinking of a radical reaction type, and the siloxane crosslinking agent affords crosslinking of an addition reaction type using a hydrosilylation reaction of an alkenyl group such as vinyl group and the like and poliorganohydrogen siloxane. When a siloxane crosslinking agent is used, polyorganosiloxane having a vinyl group is used as a silicone rubber and the like.

As the aforementioned peroxide crosslinking agent, various crosslinking agents conventionally used for silicone adhesives can be used without particular limitation. For example, benzoyl peroxide, t-butyl peroxybenzoate, dicumyl peroxide, t-butyl cumyl peroxide, t-butyloxide, 2,5-dimethyl-2,5-di(tert-butylperoxy)hexane, di-2,4-dichlorobenzoyl peroxide, bis-(2-tert-butylperoxyisopropyl)benzene, 1,1-bis(1,1-dimethylethylperoxy)-3,3,5-trimethylcyclohexane, 2,5-dimethyl-2,5-di-t-butylperoxyhexyne-3 and the like can be used. The amount of the peroxide crosslinking agent to be used is generally about 0.15-2 parts by weight, preferably 0.5-1.4 parts by weight, per 100 parts by weight of the silicone rubber.

As the siloxane crosslinking agent, for example, polyorganohydrogen siloxane having at least two hydrogen atoms on average, which are bonded to the silicon atom, in a molecule can be used. Examples of the organic group bonded to the silicon atom include alkyl group, phenyl group, alkyl halide group and the like, and methyl group is preferable since synthesis and handling are easy. The siloxane skeleton structure may be any of linear, branched and cyclic structures, with preference given to a linear structure.

The siloxane crosslinking agent is generally used in such an amount that 1-30, preferably 4-17, of the hydrogen atoms are bonded to the silicon atom relative to one vinyl group in the silicone rubber and silicone resin. When the hydrogen atom bonded to the silicon atom is less than one, sufficient cohesion strength cannot be obtained, and when it exceeds 30, the adhesion property tends to decrease. When a siloxane crosslinking agent is used, a platinum catalyst is generally used, but other various catalysts can also be used. When a siloxane crosslinking agent is used, polyorganosiloxane having a vinyl group is used as a silicone rubber, and the vinyl group is preferably about 0.0001-0.01 mol/100 g.

The silicone adhesive layer of the silicone pressure-sensitive adhesive sheet can contain a filler. For example, as the inorganic filler, fine particles such as calcium carbonate, aluminum silicate, silica, zeolite, alumina, aluminum sulfate, glass and the like can be mentioned, and as the organic filler, crosslinked natural rubber fine particles, crosslinked isoprene rubber fine particles, crosslinked silicone rubber fine particles, cellulose powder, cork grain and the like can be mentioned. Of these fillers, crosslinked silicone rubber fine particles are preferably used. The crosslinked silicone rubber fine particles are produced by finely dispersing silicone oil in water (emulsion), crosslinking and curing the oil dispersed in water by hydroxylation to give a rubbery grain, and removing water. Examples of the crosslinked silicone rubber fine particles include commercially available TREFIL manufactured by Dow Corning Toray Co., Ltd. The shape of the filler is not particularly limited and those having various shapes such as sphere, needle, hollow and the like can be used, with preference given to a spherical filler. While the size of the filler is not limited, a filler smaller than the thickness of the silicone adhesive layer is preferably used, which is preferably 0.1 μm-100 μm, generally 0.5 μm-10 μm. The amount of the filler to be added is as described above, which is 0.5-40 parts by weight per 100 parts by weight of the silicone adhesive.

The silicone adhesive layer may further contain various additives where necessary.

The silicone adhesive layer of the silicone pressure-sensitive adhesive sheet is generally formed by coating a solution obtained by dissolving a silicone adhesive and additive to be added as necessary in a solvent such as toluene and the like to a substrate, and then heating same to allow crosslinking. In addition, a method including forming a silicone adhesive layer on a release liner, and transferring the release liner onto a substrate and the like can be employed. When the silicone pressure-sensitive adhesive sheet is a double-faced pressure-sensitive adhesive sheet comprised of a silicone adhesive layer alone free of a substrate, a silicone adhesive layer is formed on a release liner and the release liner is directly used. To form a silicone adhesive layer on a substrate, a priming agent can also be used to improve anchor property of the substrate and the silicone adhesive layer.

When a double-faced pressure-sensitive adhesive sheet comprises a silicone pressure-sensitive adhesive sheet consisting only of a silicone adhesive layer, the silicone adhesive layer preferably has a thickness of about 15-100 μm.

When the silicone pressure-sensitive adhesive sheet is a double-faced pressure-sensitive adhesive sheet having a silicone adhesive layer on the both sides of a substrate, the silicone adhesive layer on the adhesion side of the optical element preferably has a thickness of 5-50 μm, the substrate preferably has a thickness of 12-50 μm, and silicone adhesive layer on the jigs sides preferably has a thickness of 5-50 μm.

When the silicone pressure-sensitive adhesive sheet is a double-faced pressure-sensitive adhesive sheet having a silicone adhesive layer on one side of a substrate, and an adhesive layer comprised of an adhesive other than the silicone adhesive on the other side of the substrate, examples of the adhesive other than the silicone adhesive include various adhesives such as acrylic adhesive, rubber adhesive and the like. In such double-faced pressure-sensitive adhesive sheet, the silicone adhesive layer preferably has a thickness of 5-50 μm, the substrate preferably has a thickness of 12-50 μm, and the adhesive layer of the adhesive other than the silicone adhesive preferably has a thickness of 5-50 μm.

<Porous Pressure-Sensitive Adhesive Sheet>

Said "porous pressure-sensitive adhesive sheet" in the present invention is a pressure-sensitive adhesive sheet having many concave holes of a micron order or below (specifically not more than 1000 μm, preferably not more than 750 μm, more preferably not more than 500 μm, still more preferably not more than 250 μm, particularly preferably not more than 100 μm) on the surface, which is preferably an adhesive porous sheet comprising a porous material layer having a continuous pore structure with a continuous hole between the adjacent spherical pores, and openings having an average pore size of 20 μm or below formed on the surface of the porous material layer, which act like a sucker. As the representative structure, a porous pressure-sensitive adhesive sheet made of a porous material layer alone, and a porous double-faced pressure-sensitive adhesive sheet having the porous material layer and the porous material 10 on the both sides of substrate can be mentioned.

The porous pressure-sensitive adhesive sheet made of a porous material layer alone is used such that the porous material layer adheres to optical elements. Since the openings of a micron order or below, which are formed on the surface of the porous material layer, act like a sucker, even when the surfaces on the jig side of the optical elements is with antifouling treatment, it is assumed that the porous material layer of the porous pressure-sensitive adhesive sheet rigidly adheres to the surface with antifouling treatment and the optical elements are stably adhered to the jigs.

The "spherical pore" that the porous material layer contained in the porous pressure-sensitive adhesive sheet has does not need to be a strictly perfect spherical pore and may be, for example, an about spherical pore with a partial twist or a pore made of a void with a big twist.

While the average pore size of the spherical pore that the porous material layer contained in the porous pressure-sensitive adhesive sheet has is not particularly limited as long as it is not more than a micron order (that is, less than 1000 μm), it is preferably less than 20 μm, more preferably not more than 15 μm, further preferably not more than 10 μm. The lower limit of the average pore size of the spherical pore is not particularly limited, and it is, for example, preferably 0.01 μm, more preferably 0.1 μm, further preferably 1 μm. When the average pore size of the spherical pore in the porous material layer is within the above-mentioned range, the porous pressure-sensitive adhesive sheet expresses high flexibility and high heat resistance.

The density of the porous material layer contained in the porous pressure-sensitive adhesive sheet is preferably 0.15 g/cm$^3$-0.6 g/cm$^3$, more preferably 0.15 g/cm$^3$-0.5 g/cm$^3$, further preferably 0.15 g/cm$^3$-0.45 g/cm$^3$, particularly preferably 0.15 g/cm$^3$-0.4 g/cm$^3$. When the density of the porous material layer in the porous pressure-sensitive adhesive sheet is within the above-mentioned range, the porous pressure-sensitive adhesive sheet expresses high flexibility and high heat resistance.

The porous material layer contained in the porous pressure-sensitive adhesive sheet preferably has a continuous pore structure with a continuous hole between the adjacent spherical pores. The continuous pore structure may be one wherein a continuous hole is formed between almost all adjacent spherical pores in the porous material, or a semi-independent semi-continuous pore structure having a comparatively small number of continuous holes.

The continuous hole present between the adjacent spherical pores can affect the property of the porous pressure-sensitive adhesive sheet. For example, the smaller the average pore size of the continuous hole is, the higher the strength of the porous pressure-sensitive adhesive sheet tends to be.

The average pore size of the continuous holes present between the adjacent spherical pores is preferably not more than 5 μm, more preferably not more than 4 μm, further preferably not more than 3 μm. The lower limit of the average pore size of the continuous hole present between the adjacent spherical pores is not particularly limited and is, for example, preferably not less than 0.001 μm, more preferably not less than 0.01 μm. When the average pore size of the continuous hole present between the adjacent spherical pores in the porous material is within the above-mentioned range, the porous material pressure-sensitive adhesive sheet expresses high flexibility and high heat resistance.

The porous pressure-sensitive adhesive sheet has an opening on the surface. The opening is derived from the opening formed on the surface of the porous material layer. While the average pore size of this opening is not particularly limited as long as it is not more than a micron order, like the porous material layer (that is, less than 1000 μm), it is preferably less than 20 μm, more preferably not more than 15 μm, further preferably not more than 10 μm, further more preferably not more than 5 μm, particularly preferably not more than 4 μm, most preferably not more than 3 μm. The lower limit of the average pore size of the opening is not particularly limited, and it is, for example, preferably 0.001 μm, more preferably 0.01 μm. When the porous pressure-sensitive adhesive sheet has a surface opening and the average pore size of the surface opening is within the above-mentioned range, the surface opening acts like a sucker and a sufficient adhesive force is expressed. In addition, a porous pressure-sensitive adhesive sheet having high flexibility and high heat resistance is produced.

The porous pressure-sensitive adhesive sheet preferably has a normal state shear adhesive force of not less than 1.0N/cm$^2$. With a normal state shear adhesive force of not less than 1.0N/cm$^2$, a sufficiently high adhesive force is exhibited to surfaces with various properties. The normal state shear adhesive force is preferably not less than 3N/cm$^2$, more preferably not less than 5N/cm$^2$, further preferably 7N/cm$^2$, particularly preferably not less than 9N/cm$^2$, most preferably not less than 10 N/cm$^2$.

Since the adhesiveness of the porous pressure-sensitive adhesive sheet mainly depends on, as mentioned above, the sucker-like surface opening, the sheet is easily separated by peeling. A 180° peel test force of the porous pressure-sensitive adhesive sheet is preferably not more than 1N/25 mm, more preferably not more than 0.8N/25 mm, further preferably not more than 0.5N/25 mm, particularly preferably not more than 0.3N/25 mm. When the 180° peel test force is within the above-mentioned range, the porous pressure-sensitive adhesive sheet showing high adhesiveness as mentioned above is separated extremely easily.

While the 50% compressive load of the porous pressure-sensitive adhesive sheet is not particularly limited, it is preferably not more than 150 N/cm$^2$, more preferably not more than 120 N/cm$^2$, further preferably not more than 100 N/cm$^2$, particularly preferably not more than 70 N/cm$^2$, most preferably not more than 50 N/cm$^2$. When the 50% compressive load is within the above-mentioned range, the porous pressure-sensitive adhesive sheet can express superior flexibility.

A porous material layer contained in a porous pressure-sensitive adhesive sheet is preferably porosity of not less than 30%, more preferably not less than 40%, further preferably not less than 50%. When, in the porous pressure-sensitive adhesive sheet, the porosity of the porous material layer is within the above-mentioned range, a sufficient adhesive force can be expressed, and high flexibility and high heat resistance can be expressed.

The porous material layer contained in the porous pressure-sensitive adhesive sheet is not particularly limited as regards the constituent materials, as long as it has the aforementioned properties and features.

Then the porous pressure-sensitive adhesive sheet has a substrate, examples of the substrate include fiber woven fabric, fiber non-woven fabric, fiber laminate fabric, fiber knitted fabric, resin sheet, metal foil sheet, inorganic fiber and the like. The thickness of the substrate may be an appropriate one according to the materials and object.

As the fiber woven fabric, a woven fabric formed from any appropriate fiber can be used. Examples of the fiber include natural fibers such as plant fiber, animal fiber, mineral fiber and the like; synthetic fibers such as regenerated fiber, synthetic fiber, semisynthetic fiber, artificial inorganic fiber and the like; and the like. Examples of the synthesis fiber include a fiber obtained by melt-spinning a thermoplastic fiber and the like. The fiber woven fabric may be processed with metal by plating, sputtering and the like.

As the fiber non-woven fabric, a non-woven fabric formed from any appropriate fiber can be used. Examples of the fiber include natural fibers such as plant fiber, animal fiber, mineral fiber and the like; synthetic fibers such as regenerated fiber, synthetic fiber, semisynthetic fiber, artificial inorganic fiber and the like; and the like. Examples of the synthesis fiber include a fiber obtained by melt-spinning a thermoplastic fiber and the like. The fiber non-woven fabric may be processed with metal by plating, sputtering and the like. More specifically, for example, a spun-bonded nonwoven fabric can be mentioned.

As the fiber laminate fabric, a laminate fabric formed from any appropriate fiber can be used. Examples of the fiber include natural fibers such as plant fiber, animal fiber, mineral fiber and the like; synthetic fibers such as regenerated fiber, synthetic fiber, semisynthetic fiber, artificial inorganic fiber and the like; and the like. Examples of the synthesis fiber include a fiber obtained by melt-spinning a thermoplastic fiber and the like. The fiber laminate fabric may be processed with metal by plating, sputtering and the like. More specifically, for example, a polyester laminate fabric can be mentioned.

As the fiber knitted fabric, a knitted fabric formed from any appropriate fiber can be used. Examples of the fiber include natural fibers such as plant fiber, animal fiber, mineral fiber and the like; synthetic fibers such as regenerated fiber, synthetic fiber, semisynthetic fiber, artificial inorganic fiber and the like; and the like. Examples of the synthesis fiber include a fiber obtained by melt-spinning a thermoplastic fiber and the like. The fiber knitted fabric may be processed with metal by plating, sputtering and the like.

As the resin sheet, a sheet formed from any appropriate resin can be used. Examples of the resin include thermoplastic resin. The resin sheet may be processed with metal by plating, sputtering and the like.

As the metal foil sheet, a sheet formed from any appropriate metal foil can be used.

As the inorganic fiber, any appropriate inorganic fiber can be used. Specific examples of the inorganic fiber include glass fiber, metal fiber, carbon fiber and the like.

When the porous pressure-sensitive adhesive sheet has a vacant space in the substrate, the same material as the porous material layer may be present in a part or all of the vacant space.

Only one kind of the substrate may be used, or two or more kinds thereof may be used in combination.

The porous pressure-sensitive adhesive sheet can be produced by any appropriate method.

[Production Method of Porous Pressure-Sensitive Adhesive Sheet Made of Single Porous Material Layer]

As a production method of a porous pressure-sensitive adhesive sheet, a "continuous method" including continuously supplying a continuous oil phase component and an aqueous phase component into an emulsifier to give a W/O emulsion, polymerizing the obtained W/O emulsion to give a water-containing polymer, and dehydrating the obtained hydrous polymer can be mentioned. In addition, for example, a "batch method" comprising adding an aqueous phase component in a suitable amount relative to the continuous oil phase component to the emulsifier, continuously supplying the aqueous phase component with stirring to give a W/O emulsion, polymerizing the obtained W/O emulsion to give a hydrous polymer, and successively dehydrating the obtained hydrous polymer can be mentioned.

As the production method of a porous pressure-sensitive adhesive sheet, the continuous polymerization method including continuous polymerization of a W/O emulsion is preferable since it shows high productivity, shortening effect of the polymerization time and downsizing of the polymerization apparatus.

The production method of a porous pressure-sensitive adhesive sheet more specifically and preferably includes step (I) for preparing a W/O emulsion, step (II) for coating the obtained W/O emulsion, step (III) for polymerizing the coated W/O emulsion, and step (IV) for dehydrating the obtained hydrous polymer. Here, step (II) for coating the obtained W/O emulsion and step (III) for polymerizing the coated W/O emulsion may be simultaneously performed at least partly.

[Step (I) for Preparing W/O Emulsion]

A W/O emulsion usable for obtaining a porous material layer is a W/O emulsion containing a continuous oil phase component and an aqueous phase component immiscible with the continuous oil phase component. More specifically explained, the W/O emulsion contains an aqueous phase component dispersed in a continuous oil phase component.

The ratio of the aqueous phase component and the continuous oil phase component in a W/O emulsion may be any appropriate ratio permitting formation of the W/O emulsion. The ratio of the aqueous phase component and the continuous oil phase component can be an important factor for determining the structural, mechanical and performance properties of the porous material obtained by polymerization of the W/O emulsion. Specifically, the ratio of the aqueous phase component and the continuous oil phase component can be an important factor for determining the density, pore size, pore structure, size of the wall forming the porous structure and the like of the porous material obtained by polymerization of the W/O emulsion.

The lower limit of the ratio of the aqueous phase component in the W/O emulsion is preferably 30 wt %, more preferably 40 wt %, further preferably 50 wt %, particularly preferably 55 wt %, and the upper limit is preferably 95 wt %, more preferably 90 wt %, further preferably 85 wt %, particularly preferably 80 wt %. When the ratio of the aqueous phase component in the W/O emulsion is within the above-mentioned range, the effect of the present invention can be sufficiently expressed.

The W/O emulsion can contain any appropriate additive as long as the effect of the present invention is not impaired. Examples of such additives include tackifier resin; talc; fillers such as calcium carbonate, magnesium carbonate, silicic acid and salts thereof, clay, mica powder, aluminum hydroxide, magnesium hydroxide, flowers of zinc, bentonite, carbon black, silica, alumina, aluminum silicate, acetylene black, aluminum powder and the like; pigment; dye; and the like. Only one kind of such additive may be used, or two or more kinds thereof may be used in combination.

The W/O emulsion can be prepared by any appropriate method. For example, a "continuous method" comprising continuously supplying a continuous oil phase component and an aqueous phase component to an emulsifier to form a W/O emulsion, a "batch method" comprising adding an aqueous phase component in a suitable amount relative to the continuous oil phase component to the emulsifier, continuously supplying the aqueous phase component with stirring to give a W/O emulsion and the like can be mentioned.

For preparation of a W/O emulsion, a shearing device to afford an emulsion state includes, for example, application of high shear conditions by using a rotor stator mixer, a homogenizer, a microfluidization apparatus and the like. In addition, a different shearing device to afford an emulsion state is, for example, mild mixing of continuous and dispersion phases by applying low shear conditions using shaking with a rotor blade mixer or a pin mixer, magnetic stirring bar and the like.

An apparatus for preparing a W/O emulsion by the "continuous method" is, for example, a static mixer, a rotor stator mixer, a pin mixer and the like. More vigorous stirring may be achieved by increasing the stirring rate, or using an apparatus designed for ultrafinely dispersing an aqueous phase component in a W/O emulsion by the mixing method.

Examples of the apparatus for preparing a W/O emulsion by the "batch method" include manual mixing, shaking, driven rotor blade mixer, mixing blade with three propellers and the like.

The method for preparing a continuous oil phase component may be any appropriate method. A representative method for preparing a continuous oil phase component includes, for example, preparing a syrup mixture containing a hydrophilic polyurethane polymer and an unsaturated ethylene monomer, and adding a polymerization initiator, a crosslinking agent, and other any appropriate components to the syrup mixture.

The method for preparing a hydrophilic polyurethane polymer may be any appropriate method. A hydrophilic polyurethane polymer representatively includes, for example, reacting polyoxyethylene polyoxypropylene glycol with a diisocyanate compound in the presence of a urethane catalyst.

<<Aqueous Phase Component>>

As the aqueous phase component, any aqueous fluid substantially immiscible with the continuous oil phase component can be employed. Water such as ion exchange water and the like is preferable from the aspects of easy handling and low cost.

The aqueous phase component can contain any appropriate additive as long as the effect of the present invention is not impaired. Examples of such additive include polymerization initiator, water-soluble salt and the like. A water-soluble salt can be an additive effective for further stabilizing W/O emulsion. Examples of such water soluble salt include sodium carbonate, calcium carbonate, potassium carbonate, sodium phosphate, calcium phosphate, potassium phosphate, sodium chloride, potassium chloride and the like. Only one kind of such additive may be used, or two or more kinds thereof may be used in combination. Only one kind of the additive may be contained in an aqueous phase component, or two or more kinds thereof may be contained in combination.

<<Continuous Oil Phase Component>>

The continuous oil phase component preferably contains a hydrophilic polyurethane polymer and an unsaturated ethylene monomer. The content ratio of the hydrophilic polyurethane polymer and unsaturated ethylene monomer in the continuous oil phase component may be any appropriate ratio which does not impair the effect of the present invention.

For example, the hydrophilic polyurethane polymer preferably contains 10-30 parts by weight of the hydrophilic polyurethane polymer relative to 70-90 parts by weight of the unsaturated ethylene monomer, more preferably, 10-25 parts by weight of the hydrophilic polyurethane polymer relative to 75-90 parts by weight of the unsaturated ethylene monomer, though subject to change depending on the polyoxyethylene ratio of the polyoxyethylene polyoxypropylene glycol unit constituting the hydrophilic polyurethane polymer, or the amount of the aqueous phase component to be added. For example, the amount of the hydrophilic polyurethane polymer is preferably 1-30 parts by weight, more preferably 1-25 parts by weight, per 100 parts by weight of the aqueous phase component. When the content ratio of the hydrophilic polyurethane polymer is within the above-mentioned range, the effect of the present invention can be sufficiently expressed.

{Hydrophilic Polyurethane Polymer}

The hydrophilic polyurethane polymer preferably contains a polyoxyethylene polyoxypropylene glycol-derived polyoxyethylene polyoxypropylene unit, and 5 wt %-25 wt % of the polyoxyethylene polyoxypropylene unit is polyoxyethylene.

The content ratio of polyoxyethylene in the above-mentioned polyoxyethylene polyoxypropylene unit is preferably 5 wt %-25 wt % as mentioned above, wherein the lower limit is more preferably 10 wt % and the upper limit is more preferably 20 wt %. Polyoxyethylene in the above-mentioned polyoxyethylene polyoxypropylene unit shows an effect of stably dispersing the aqueous phase component in the continuous oil phase component. When the content ratio of polyoxyethylene in the above-mentioned polyoxyethylene polyoxypropylene unit is less than 5 wt %, the aqueous phase component may not be stably dispersed in the continuous oil phase component. When the content ratio of polyoxyethylene in the above-mentioned polyoxyethylene polyoxypropylene unit exceeds 25 wt %, W/O emulsion may change phase to O/W type (oil-in-water type) emulsion as the conditions become closer to the HIPE conditions.

Conventional hydrophilic polyurethane polymers are obtained by reacting a diisocyanate compound, hydrophobicity long chain diol, polyoxyethyleneglycol or a derivative thereof, and a low molecular active hydrogen compound (chain elongation agent). Since the number of polyoxyethylene groups contained in the hydrophilic polyurethane polymer obtained by such method is not uniform, a W/O emulsion containing such hydrophilic polyurethane polymer may have lower emulsion stability. The hydrophilic polyurethane polymer contained in the continuous oil phase component of the W/O emulsion used to produce the porous pressure-sensitive adhesive sheet of the present invention has the above-mentioned characteristic structure. Therefore, when the polymer is added to the continuous oil phase component of a W/O emulsion, superior emulsifiability and superior stability during standing preservation can be expressed even without addition of an emulsifier and the like.

The hydrophilic polyurethane polymer is preferably obtained by reacting polyoxyethylene polyoxypropylene glycol with a diisocyanate compound. In this case, the lower limit of the NCO/OH (equivalence ratio) of polyoxyethylene polyoxypropylene glycol and diisocyanate compound is preferably 1, more preferably 1.2, further preferably 1.4, particularly preferably 1.6, and the upper limit is preferably 3, more preferably 2.5, further preferably 2. When the NCO/OH (equivalence ratio) is less than 1, a gelled product may be easily produced during the production of the hydrophilic polyurethane polymer. When the NCO/OH (equivalence ratio) exceeds 3, the diisocyanate compound residue increases, and the W/O emulsion usable for obtaining the porous pressure-sensitive adhesive sheet of the present invention may become unstable.

Examples of the polyoxyethylene polyoxypropylene glycol include polyetherpolyol manufactured by ADEKA corporation (ADEKA (registered trade mark) pluronic L-31, L-61, L-71, L-101, L-121, L-42, L-62, L-72, L-122, 25R-1, 25R-2, 17R-2), polyoxyethylene polyoxypropylene glycol manufactured by Nippon Oil & Fats Co., Ltd. (PLONON (registered trade mark) 052, 102, 202) and the like. Only one kind of polyoxyethylene polyoxypropylene glycol may be used, or two or more kinds thereof may be used in combination.

Examples of the diisocyanate compound include aromatic, aliphatic and alicyclic diisocyanates, dimer and trimer of these diisocyanates, polyphenylmethane polyisocyanate and the like. Examples of the aromatic, aliphatic and alicyclic diisocyanates include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanate-methyl)cyclohexane, methylcyclohexane diisocyanate, m-tetramethylxylylene diisocyanate and the like. Examples of the trimer of diisocyanate include isocyanurate type, biuret type, allophanate type and the like. Only one kind of diisocyanate compound may be used, or two or more kinds thereof may be used in combination.

The kind, combination and the like of the diisocyanate compound can be appropriately determined in consideration of urethane reactivity with polyol and the like. Use of alicyclic diisocyanate is preferable from the aspects of quick urethane reactivity with polyol, suppression of reaction with water and the like.

The lower limit of the weight average molecular weight of the hydrophilic polyurethane polymer is preferably 5000, more preferably 7000, further preferably 8000, particularly preferably 10000, and the upper limit thereof is preferably 50000, more preferably 40000, further preferably 30000, particularly preferably 20000.

The hydrophilic polyurethane polymer may have a radical polymerizable unsaturated double bond on the terminal. When a radical polymerizable unsaturated double bond is present on the terminal of a hydrophilic polyurethane polymer, the effect of the present invention can be further expressed.

{Unsaturated Ethylene Monomer}

As the unsaturated ethylene monomer, any appropriate monomer can be used as long as it has an ethylenically unsaturated double bond. Only one kind of unsaturated ethylene monomer may be used, or two or more kinds thereof may be used in combination.

The unsaturated ethylene monomer preferably contains (meth)acrylic ester. The lower limit of the content ratio of the (meth)acrylic ester in the unsaturated ethylene monomer is preferably 80 wt %, more preferably 85 wt %, and the upper limit thereof is preferably 100 wt %, more preferably 98 wt %. Only one kind of (meth)acrylic ester may be used, or two or more kinds thereof may be used in combination.

Preferred as the (meth)acrylic ester is alkyl(meth)acrylate having a $C_{1-20}$ alkyl group (including cycloalkyl group, alkyl (cycloalkyl) group, (cycloalkyl)alkyl group). The carbon number of the above-mentioned alkyl group is preferably 4-18. The (meth)acrylic means acrylic and/or methacryl, and the (meth)acrylate means acrylate and/or methacrylate.

Examples of the alkyl(meth)acrylate having a $C_{1-20}$ alkyl group include methyl(meth)acrylate, ethyl(meth)acrylate, propyl(meth)acrylate, n-butyl(meth)acrylate, s-butyl(meth)acrylate, t-butyl(meth)acrylate, isobutyl(meth)acrylate, n-pentyl(meth)acrylate, isopentyl(meth)acrylate, hexyl(meth)acrylate, heptyl(meth)acrylate, isoamyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, isomyristyl(meth)acrylate, n-tridecyl(meth)acrylate, n-tetradecyl(meth)acrylate, stearyl(meth)acrylate, lauryl(meth)acrylate, pentadecyl(meth)acrylate, hexadecyl(meth)acrylate, heptadecyl(meth)acrylate, octadecyl(meth)acrylate, nonadecyl(meth)acrylate, eicosyl(meth)acrylate, isostearyl(meth)acrylate and the like. Among these, n-butyl(meth)acrylate or 2-ethylhexyl(meth)acrylate is preferable. Only one kind of alkyl(meth)acrylate having a $C_{1-20}$ alkyl group may be used, or two or more kinds thereof may be used in combination.

The unsaturated ethylene monomer preferably further contains a polar monomer copolymerizable with (meth)acrylic ester. The lower limit of the content ratio of the polar monomer in the unsaturated ethylene monomer is preferably 0 wt %, more preferably 2 wt %, and the upper limit thereof is preferably 20 wt %, more preferably 15 wt %. Only one kind of polar monomer may be used, or two or more kinds thereof may be used in combination.

Examples of the polar monomer include carboxyl group-containing monomers such as (meth)acrylic acid, carboxyethyl(meth)acrylate, carboxypentyl(meth)acrylate, ω-carboxy-polycaprolactone monoacrylate, phthalic acid monohydroxyethylacrylate, itaconic acid, maleic acid, fumaric acid, crotonic acid and the like; acid anhydride monomers such as maleic anhydride, itaconic anhydride and the like; hydroxyl group-containing monomers such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl(meth)acrylate and the like; amide group-containing monomers such as N,N-dimethyl(meth)acrylamide, N,N-diethyl(meth)acrylamide and the like; and the like.

{Polymerization Initiator}

The continuous oil phase component preferably contains a polymerization initiator.

Examples of the polymerization initiator include radical polymerization initiator, redox polymerization initiator and the like. Examples of the radical polymerization initiator include thermal polymerization initiator and photo photopolymerization initiator.

Examples of the thermal polymerization initiator include an azo compound, peroxide, peroxycarbonic acid, peroxy carbonate, potassium persulphate, t-butyl peroxyisobutyrate, 2,2'-azobisisobutyronitrile and the like.

Examples of the photopolymerization initiator include acetophenone photopolymerization initiators such as 4-(2-hydroxyethoxy)phenyl(2-hydroxy-2-propyl)ketone (e.g., manufactured by BASF JAPAN Ltd., trade name; DAROCUR2959), α-hydroxy-α,α'-dimethylacetophenone (e.g., manufactured by BASF JAPAN Ltd., trade name; DAROCUR1173), methoxyacetophenone, 2,2-dimethoxy-2-phenylacetophenone (e.g., manufactured by BASF JAPAN Ltd., trade name; IRGACURE651), 2-hydroxy-2-cyclohexylacetophenone (e.g., manufactured by BASF JAPAN Ltd., trade name; IRGACURE184) and the like; ketal photo photopolymerization initiators such as benzyl dimethyl ketal and the like; other halogenated ketone; acyl phosphineoxide (e.g., manufactured by BASF JAPAN Ltd., trade name; IRGACURE819); and the like.

Only one kind of a polymerization initiator may be used, or two or more kinds thereof may be used in combination.

The lower limit of the content ratio of the polymerization initiator relative to the whole continuous oil phase component is preferably 0.05 wt %, more preferably 0.1 wt %, and the upper limit thereof is preferably 5.0 wt %, more preferably 1.0 wt %. When the content ratio of the polymerization initiator is less than 0.05 wt % relative to the whole continuous oil phase component, the content of unreacted monomer components increases, and the amount of the monomer residue in the obtained porous material may increase. When the content ratio of the polymerization initiator exceeds 5.0 wt % relative to the whole continuous oil phase component, the mechanical property of the obtained porous material may decrease.

The amount of the radical generated by a photopolymerization initiator varies depending on the kind, strength and irradiation time of the irradiated light, and the content of oxygen dissolved in monomer and a solvent mixture and the like. When the content of the dissolved oxygen is high, the amount of the radical generated by a photopolymerization initiator is suppressed, the polymerization does not proceed sufficiently, and unreacted products may increase. It is therefore preferable before light irradiation to blow an inert gas such as nitrogen and the like into the reaction system to substitute oxygen with the inert gas or deaerate the reaction system by a depressurization treatment.

{Crosslinking Agent}

The continuous oil phase component preferably contains a crosslinking agent.

The crosslinking agent is used to construct a more three-dimensional molecular structure by typically connecting polymer chains. The kind and content of the crosslinking agent vary depending on the structural property, mechanical property, and fluid treatment property that the obtained porous pressure-sensitive adhesive sheet is desired to have. Selection of specific kind and content of the crosslinking agent is important for the realization of a desirable combination of the structural property, mechanical property, and fluid treatment property of a porous pressure-sensitive adhesive sheet.

For production of a porous pressure-sensitive adhesive sheet (porous material layer), at least two kinds of crosslinking agents having different weight average molecular weights are preferably used as crosslinking agents.

More preferably, "one or more kinds selected from polyfunctional (meth)acrylate, polyfunctional (meth)acrylamide, and polymerization reactive oligomer, which have a weight average molecular weight of not less than 800" and "one or more kinds selected from polyfunctional (meth)acrylate and polyfunctional (meth)acrylamide, which have a weight average molecular weight of not more than 500" are used in combination as the crosslinking agent. Here, the polyfunctional (meth)acrylate is specifically a polyfunctional (meth)acrylate having at least two ethylene unsaturated groups in one molecule, and the polyfunctional (meth)acrylamide is specifically a polyfunctional (meth)acrylamide having at least two ethylene unsaturated groups in one molecule.

Examples of the polyfunctional (meth)acrylate include diacrylates, triacrylates, tetraacrylates, dimethacrylates, trimethacrylates, tetramethacrylates and the like.

Examples of the polyfunctional (meth)acrylamide include diacrylamides, triacrylamides, tetraacrylamides, dimethacrylamides, trimethacrylamides, tetramethacrylamides and the like.

The polyfunctional (meth)acrylate can be induced from, for example, diol, triol, tetraol, bisphenol A and the like. Specifically, for example, the polyfunctional (meth)acrylate can be induced from 1,10-decanediol, 1,8-octanediol, 1,6-hexane-diol, 1,4-butanediol, 1,3-butanediol, 1,4-butane-2-enediol, ethylene glycol, diethylene glycol, trimethylolpropane, pentaerythritol, hydroquinone, catechol, resorcinol, triethylene glycol, polyethylene glycol, sorbitol, polypropylene glycol, polytetramethylene glycol, propylene oxide-modified bisphenol A and the like.

The polyfunctional (meth)acrylamide can be induced from, for example, corresponding diamines, triamines, tetraamines and the like.

Examples of the polymerization reactive oligomer include urethane(meth)acrylate, epoxy(meth)acrylate, copolyester (meth)acrylate, oligomer di(meth)acrylate and the like. Preferred is hydrophobic urethane(meth)acrylate.

The weight average molecular weight of the polymerization reactive oligomer is preferably not less than 1500, more preferably not less than 2000. While the upper limit of the weight average molecular weight of the polymerization reactive oligomer is not particularly set, it is, for example, preferably not more than 10000.

When "one or more kinds selected from polyfunctional (meth)acrylate, polyfunctional (meth)acrylamide, and polymerization reactive oligomer, which have a weight average molecular weight of not less than 800" and "one or more kinds selected from polyfunctional (meth)acrylate and polyfunctional (meth)acrylamide, which have a weight average molecular weight of not more than 500" are used in combination as the crosslinking agent, the lower limit of the amount of the "one or more kinds selected from polyfunctional (meth)acrylate, polyfunctional (meth)acrylamide, and polymerization reactive oligomer, which have a weight average molecular weight of not less than 800" to be used relative to the total amount of hydrophilic polyurethane polymer and unsaturated ethylene monomer in the continuous oil phase component is preferably 40 wt %, and the upper limit thereof is preferably 100 wt %, more preferably 80 wt %. When the amount of the "one or more kinds selected from polyfunctional (meth)acrylate, polyfunctional (meth)acrylamide, and polymerization reactive oligomer, which have a weight average molecular weight of not less than 800" to be used is less than 40 wt % of the total amount of hydrophilic polyurethane polymer and unsaturated ethylene monomer in the continuous oil phase component, the cohesion strength of the obtained porous pressure-sensitive adhesive sheet may decrease, thus making it difficult to simultaneously achieve toughness and flexibility. When the amount of the "one or more kinds selected from polyfunctional (meth)acrylate, polyfunctional (meth)acrylamide, and polymerization reactive oligomer, which have a weight average molecular weight of not less than 800" to be used exceeds 100 wt % relative to the total amount of hydrophilic polyurethane polymer and unsaturated ethylene monomer in the continuous oil phase component, the emulsion stability of the W/O emulsion may decrease, and a desired porous pressure-sensitive adhesive sheet (porous material layer) may not be obtained.

When "one or more kinds selected from polyfunctional (meth)acrylate, polyfunctional (meth)acrylamide, and polymerization reactive oligomer, which have a weight average molecular weight of not less than 800" and "one or more kinds selected from polyfunctional (meth)acrylate and polyfunctional (meth)acrylamide, which have a weight average molecular weight of not more than 500" are used in combination as the crosslinking agent, the lower limit of the amount of the "one or more kinds selected from polyfunctional (meth)acrylate, polyfunctional (meth)acrylamide, and polymerization reactive oligomer, which have a weight average molecular weight of not more than 500" to be used relative to the total amount of hydrophilic polyurethane polymer and unsaturated ethylene monomer in the continuous oil phase component is preferably 1 wt %, more preferably 5 wt %, and the upper limit thereof is preferably 30 wt %, more preferably 20 wt %. When the amount of the "one or more kinds selected from polyfunctional (meth)acrylate and polyfunctional (meth)acrylamide, which have a weight average molecular weight of not more than 500" to be used is less than 1 wt % of the total amount of hydrophilic polyurethane polymer and unsaturated ethylene monomer in the continuous oil phase component, the heat resistance may decrease, and the pore structure may be crushed by shrinkage in step (IV) for dehydrating the hydrous polymer. When the amount of the "one or more kinds selected from polyfunctional (meth)acrylate and polyfunctional (meth)acrylamide, which have a weight average molecular weight of not more than 500" to be used exceeds 30 wt % of the total amount of hydrophilic polyurethane polymer and unsaturated ethylene monomer in the continuous oil phase component, the toughness of the obtained porous pressure-sensitive adhesive sheet may decrease to show brittleness.

Only one kind of a crosslinking agent may be used, or two or more kinds thereof may be used in combination.

{Other Components in Continuous Oil Phase Component}

The continuous oil phase component may contain any other appropriate component as long as the effect of the present invention is not impaired. Representative preferable examples of such other component include catalyst, antioxidant, organic solvent and the like. Only one kind of such other component may be used, or two or more kinds thereof may be used in combination.

Examples of the catalyst include urethane catalysts. As the urethane catalyst, any appropriate catalyst can be employed. Specifically, for example, dibutyltin dilaurate can be mentioned.

The content ratio of the catalyst may be any appropriate ratio according to the desired catalytic reaction.

Only one kind of a catalyst may be used, or two or more kinds thereof may be used in combination.

Examples of the antioxidant include phenolic antioxidant, thioether antioxidant, phosphorus-based antioxidant and the like.

The content ratio of the antioxidant may be any appropriate ratio that does not impair the effect of the present invention.

Only one kind of an antioxidant may be used, or two or more kinds thereof may be used in combination.

The organic solvent may be any appropriate organic solvent that does not impair the effect of the present invention.

The content ratio of the organic solvent may be any appropriate ratio that does not impair the effect of the present invention.

Only one kind of an organic solvent may be used, or two or more kinds thereof may be used in combination.

[Step (II) for Coating W/O Emulsion]

The method for coating a W/O emulsion in step (II) may be any appropriate coating method. For example, the method includes continuously supplying a W/O emulsion on a running belt to form a smooth sheet on the belt. Alternatively, for example, the method includes coating a surface of a thermoplastic resin film with a W/O emulsion.

In step (II), when the method includes coating the surface of a thermoplastic resin film with a W/O emulsion, examples of the coating method include use of a roll coater, a die coater, a knife coater and the like.

[Step (III) for Polymerization of Coated W/O Emulsion]

In step (III), the method of polymerization of the coated W/O emulsion may be any appropriate polymerization method. For example, a method including continuously supplying a W/O emulsion on a running belt to form a smooth sheet on the belt while performing polymerization by heating, which uses a heating apparatus to heat the surface of a belt conveyor, a method including continuously supplying a W/O emulsion on a running belt to form a smooth sheet on the belt while performing polymerization by irradiation of an activation energy line, which uses irradiation of an activation energy line to heat the surface of a belt conveyor can be mentioned.

For polymerization by heating, the lower limit of the polymerization temperature (heating temperature) is preferably 23° C., more preferably 50° C., further preferably 70° C., particularly preferably 80° C., most preferably 90° C. The upper limit thereof is preferably 150° C., more preferably 130° C., further preferably 110° C. When the polymerization temperature is less than 23° C., the polymerization takes a long time and the industrial productivity may decrease. When the polymerization temperature exceeds 150° C., the pore size of the obtained porous pressure-sensitive adhesive sheet may be non-uniform and the strength of the porous pressure-sensitive adhesive sheet (porous material layer) may decrease. The polymerization temperature does not need to be constant, and may vary in, for example, two stages or multi stages during the polymerization.

For polymerization by irradiation of an activation energy line, examples of the activation energy line include UV, visible light, electron beam and the like. The activation energy line is preferably UV or visible light, more preferably, visible—ultraviolet ray having a wavelength of 200 nm-800 nm. While W/O emulsion strongly tends to scatter the light, visible—ultraviolet ray having a wavelength of 200 nm-800 nm can penetrate the W/O emulsion. In addition, a photopolymerization initiator capable of activating at a wavelength of 200 nm-800 nm is easily available and a light source is easily obtained.

The lower limit of the wavelength of the activation energy line is preferably 200 nm, more preferably 300 nm, and the upper limit is preferably 800 nm, more preferably 450 nm.

Examples of the representative apparatus to be used for the irradiation of activation energy line include an apparatus having a spectrum distribution in a wavelength region of 300-400 nm, such as a UV lamp capable of UV irradiation. Examples thereof include chemical lamp, black light (trade name, manufactured by Toshiba Lighting and Technology Co., Ltd.), metal-halide lamp and the like.

The illuminance of the irradiation of activation energy line can be set to any appropriate illuminance by adjusting the distance from the irradiation equipment to the irradiated body and voltage. For example, UV irradiation in each step is divided and performed in plural steps by the method disclosed in JP-A-2003-13015, whereby adhesion performance can be precisely adjusted.

To prevent adverse influences exerted by oxygen having a polymerization inhibitory effect, for example, UV irradiation is preferably performed under an inert gas atmosphere after coating one surface of a substrate such as a thermoplastic resin film and the like with a W/O emulsion, or after coating one surface of a substrate such as a thermoplastic resin film and the like with a W/O emulsion and applying a film that allows passage of UV but shuts off oxygen such as poly(ethylene terephthalate) coated with a release agent such as silicone and the like, and the like.

As a thermoplastic resin film, any appropriate thermoplastic resin film can be employed as long as it permits coating of one surface with a W/O emulsion. Examples of the thermoplastic resin film include plastic films such as polyester, olefin resin, polyvinyl chloride and the like, and a sheet.

The inert gas atmosphere is an atmosphere wherein oxygen in light irradiation zone is substituted with an inert gas. Therefore, the least possible presence of oxygen is necessary in the inert gas atmosphere, which is preferably an oxygen concentration of not more than 5000 ppm.

[Step (IV) for Dehydration of Obtained Hydrous Polymer]

In step (IV), the obtained hydrous polymer is dehydrated. An aqueous phase component is dispersed in the hydrous polymer obtained in step (III). The aqueous phase component is removed by dehydration and dried, whereby the porous material included in the porous pressure-sensitive adhesive sheet of the present invention is obtained. The obtained porous material can be directly used as the porous pressure-sensitive adhesive sheet of the present invention. As mentioned below, by combining the porous material with a substrate, the porous pressure-sensitive adhesive sheet of the present invention can also be provided.

The dehydration method for step (IV) may be any appropriate drying method. Examples of such drying method include vacuum drying, freeze-drying, press drying, microwave drying, drying in a heated oven, drying with infrared ray, a combination of these techniques, and the like.

[When Porous Pressure-Sensitive Adhesive Sheet Contains Substrate]

When a porous pressure-sensitive adhesive sheet contains a substrate, one of the preferable embodiments of the production method of the porous pressure-sensitive adhesive sheet includes coating one surface of a substrate with a W/O emulsion and heating or irradiating an activation energy line under an inert gas atmosphere, or applying a UV-permeable film coated with a release agent such as silicone and the like to shut off oxygen, thus allowing polymerization of the W/O emulsion to give a hydrous polymer, and dehydrating the obtained hydrous polymer to give a porous pressure-sensitive adhesive sheet having a substrate/foamed layer laminate structure.

In another preferable embodiment of the production method of the porous pressure-sensitive adhesive sheet, a W/O emulsion is applied to one surface of a UV permeable film, which surface has been coated with a release agent such as silicone and the like, two such films are prepared, a substrate is laminated on the coated surface of one of the two W/O emulsion-coated sheets, the coated surface of the other W/O emulsion-coated sheet is laminated on the other surface of the laminated substrate, the resulting laminate is heated or irradiated with activation energy line to allow polymerization of the W/O emulsion to give a hydrous polymer, and the obtained hydrous polymer is dehydrated to give a porous pressure-sensitive adhesive sheet having a laminate structure of foamed layer/substrate/foamed layer.

Examples of the method for coating a W/O emulsion on one surface of a substrate or a UV permeable film coated with a release agent such as silicone and the like include use of a roll coater, a die coater, a knife coater and the like.

In the method of the present invention, a optical element may be fixed to a jig by a method other than a method using a double-faced adhesive sheet explained above and a method using a jig having a frame formed on the surface of a pedestal as explained above (FIG. 3), which restrains a optical element from moving in the horizontal direction of the optical element, though the jig is used to fix a optical element free of rotation. For example, a jig having an adsorption part to adsorb a optical element by suction, a jig having an adsorption part to adsorb a optical element by suction and an adherend part of a optical element by a double-faced adhesive sheet and the like can be mentioned. A jig having an adsorption part to adsorb a optical element by suction is advantageous in that a optical element can be easily taken out from the jig after separation work of two optical elements, by stopping suction or flowing a gas such as air and the like, which facilitates recovery without damaging the optical element after separation.

The optical element after separation is released from the jig. The double-faced adhesive sheet and the optical element can be detached from the jig by peeling off the double-faced adhesive sheet adhered to the jig from the end portion thereof. Particularly, since silicone adhesive sheet and porous adhesive sheet have superior removability, they can be easily peeled off from the end portion and can be easily peeled off from the jig. Thereafter, the double-faced adhesive sheet is separated from the optical element released from the jig, and where necessary, the residue of the adhesive sheet or curable resin layer attached to the optical element is removed by washing with a solvent and the like. Since silicone adhesive sheet and porous adhesive sheet have superior removability, the optical element may be directly peeled off from a silicone adhesive sheet or porous adhesive sheet adhered to the jig.

[Step 5]

In this step, the optical elements separated from optical laminate 2 in step 4 are washed. This step is optionally performed, when the two optical elements separated from of the optical laminate in step 4 do not have a remaining adhesive and the like or, even when an adhesive remains, no adverse effect is imposed on the reuse of the optical element, the optical element obtained from step 4 may be reused as an optical element in step 1.

For washing the optical element, a suitable solvent is selected depending on the kind of an adhesive sheet, material of the optical element and the like. In the case of an acrylic adhesive sheet, for example, alcohol solvents such as isopropyl alcohol and the like are preferable. Besides these, ketone (acetone, methylethyl ketone and the like), ether (tetrahydrofuran, ethylene glycol diethyl ether and the like), ester(methyl acetate, ethyl acetate, ethylene glycol monomethyletheracetate, ethylene glycol monoethyletheracetate, glycol diacetate etc.) solvents can also be used. In the case of a transparent polyoxyalkylene adhesive sheet, for example, alcohol solvents such as isopropyl alcohol and the like are preferable. Besides these, ketone (acetone, methylethyl ketone and the like), ether (tetrahydrofuran, ethylene glycol diethyl ether and the like), ester(methyl acetate, ethyl acetate, ethylene glycol monomethyletheracetate, ethylene glycol monoethyletheracetate, glycol diacetate etc.) solvents and the like can also be used.

EXAMPLES

The present invention is explained in more detail in the following by referring to Examples and Comparative Examples.

In the following, parts and % are based on weight.

Production Example 1

Adhesive Sheet

To a mixture of 2-ethylhexyl acrylate (2EHA, 99.4 parts by weight) and acrylic acid (AA, 0.5 parts by weight) were added trade name "IRGACURE 184" manufactured by CIBA SPECIALTY CHEMICALS K.K. (0.05 parts by weight) and trade name "IRGACURE 651" manufactured by CIBA SPECIALTY CHEMICALS K.K. (0.05 parts by weight) as photopolymerization initiators, and UV was irradiated until the viscosity (BH viscometer No. 5 rotor, 10 rpm, measurement temperature 30° C.) became about 20 Pa·s to produce a prepolymer composition wherein a part of the above-mentioned monomer components was polymerized.

To the prepolymer composition obtained above were added hexanediol diacrylate (multifunctional monomer, 0.1 part by weight), a silane coupling agent (manufactured by Shin-Etsu Chemical Co., Ltd., trade name "KBM-403", 0.3 parts by weight), and additional photopolymerization initiators [trade name "IRGACURE 184" manufactured by CIBA SPECIALTY CHEMICALS K.K. (0.1 part by weight) and trade name "IRGACURE 651" manufactured by CIBA SPECIALTY CHEMICALS K.K. (0.1 part by weight)] to give an acrylic adhesive composition.

The above-mentioned acrylic adhesive composition was applied onto a poly(ethylene terephthalate) (PET) separator (manufactured by Mitsubishi Plastics, Inc., "MRF75") such that the final thickness (thickness of acrylic adhesive layer) was 175 μm to form a coating layer. Then, a PET separator (manufactured by Mitsubishi Plastics, Inc., "MRF38") was formed on the application layer, and the coating layer was applied thereon to shut off oxygen. Thereafter, UV (illuminance 5 mW/cm$^2$) was irradiated for 300 seconds by a black light (manufactured by TOSHIBA CORPORATION) from the upper surface (MRF38 side) of the MRF75/coating layer/MRF38 laminate. Furthermore, the laminate was dried in a drying machine at 130° C. for 2 min to volatilize the residual monomer to form an acrylic adhesive layer, whereby a 175 μm-thick double-faced adhesive sheet (substrate-free double-faced adhesive sheet comprising only an acrylic adhesive layer) was obtained. The gel fraction of the obtained double-faced adhesive sheet was 71.3%. The gel fraction was evaluated according to the aforementioned "(Measurement method of gel fraction)". The haze was 0.5% and the total light transmittance was 92%.

Production Example 2

Production of Porous Double-Faced Adhesive Sheet

Preparation of Syrup Mixture 1

A monomer solution containing 2-ethylhexyl acrylate (manufactured by TOAGOSEI CO., LTD., hereinafter to be abbreviated as "2EHA", 173.2 parts by weight) as an unsaturated ethylene monomer, ADEKA (registered trade mark) pluronicL-62 (molecular weight 2500, manufactured by ADEKA CORPORATION, polyetherpolyol, 100 parts by weight) as polyoxyethylene polyoxypropylene glycol, and dibutyltin dilaurate (manufactured by KISHIDA CHEMICAL Co., Ltd., hereinafter to be abbreviated as "DBTL", 0.014 part by weight) as a urethane catalyst were placed in a reaction vessel provided with a condenser, a thermometer and a stirrer, and hydrogenated xylylene diisocyanate (manufactured by Takeda Pharmaceutical Company Limited, Takenate 600, hereinafter to be abbreviated as "HXDI", 12.4 parts by weight) was added dropwise with stirring to allow reaction of the mixture at 65° C. for 4 hr. The content ratio of the polyisocyanate component and the polyol component used was NCO/OH (equivalence ratio)=1.6. Thereafter, 2-hydroxyethyl acrylate (manufactured by KISHIDA CHEMICAL Co., Ltd., hereinafter to be abbreviated as "HEA", 5.6 parts by weight) was added dropwise, and the mixture was reacted at 65° C. for 2 hr to give a syrup mixture of hydrophilic polyurethane polymer having acryloyl group on both terminals/unsaturated ethylene monomer. The weight average molecular weight of the obtained hydrophilic polyurethane polymer was 15,000. 2EHA (79.1 part by weight), isobornylacrylate (manufactured by Osaka Organic Chemical Industry Ltd., hereinafter to be abbreviated as "IBXA", 17.6 parts by weight), and acrylic acid (manufactured by TOAGOSEI CO., LTD., hereinafter to be abbreviated as "AA", 10.5 parts by weight) as a polar monomer were added relative to 100 parts by weight of the obtained hydrophilic polyurethane polymer/unsaturated ethylene monomer syrup mixture to give hydrophilic polyurethane polymer/unsaturated ethylene monomer syrup mixture 1.

The obtained hydrophilic polyurethane polymer/unsaturated ethylene monomer syrup mixture 1 (100 parts by weight) was uniformly mixed with 1,6-hexanedioldiacrylate (manufactured by SHIN-NAKAMURA CHEMICAL CO., LTD., trade name "NKester A-HD-N", molecular weight 226, 11.9 parts by weight), urethane acrylate as a reactive oligomer, which is synthesized from polytetramethyleneglycol (hereinafter to be abbreviated as "PTMG") and isophoronediisocyanate (hereinafter to be abbreviated as "IPDI") wherein the both terminals of polyurethane are treated with HEA and the both terminals have an unsaturated ethylenic group (hereinafter to be abbreviated as "UA", molecular weight 3720, 47.7 parts by weight), diphenyl(2,4,6-trimethylbenzoyl)phosphineoxide (manufactured by BASF, trade name "Lucirin TPO", 0.5 part by weight), and a hindered phenol antioxidant (manufactured by BASF JAPAN Ltd., trade name "Irganox 1010", 1.0 part by weight to give a continuous oil phase component (hereinafter to be referred to as "oil phase"). Ion exchange water (300 parts by weight) as an aqueous phase component (hereinafter to be referred to as "aqueous phase") was continuously added dropwise relative to 100 parts by weight of the above-mentioned oil phase into a stirring blending machine, which is an emulsifying machine containing the above-mentioned oil phase, at the ambient temperature to give a stable W/O emulsion. The weight ratio of the aqueous phase and oil phase was 75/25.

The W/O emulsion stood still after the preparation at ambient temperature for 30 min was applied onto a release-treated poly(ethylene terephthalate) film (thickness 38 μm, hereinafter to be referred to as "PET film") to achieve the thickness of a highly hydrous crosslinked polymer layer of 150 μm after light irradiation, and continuously formed into a sheet. Furthermore, a 70 μm-thick polyester fiber laminate fabric (manufactured by NISSEKI PLASTO CO., LTD., trade name "Milife (registered trade mark) TY1010E"), wherein elongated polyester continuous fibers are aligned in length and breadth and laminated, was laminated thereon. Furthermore, a W/O emulsion separately stood still after the preparation at ambient temperature for 30 min was applied onto a 38 μm-thick release-treated PET film to achieve the thickness of a highly hydrous crosslinked polymer layer of 150 μm after light irradiation, and the coated surface was placed on the above-mentioned polyester fiber laminate fabric. The sheet was irradiated with UV (light illuminance 5 mW/cm$^2$ as measured by TOPCON UVR-T1 having peak sensitivity maximum wave of 350 nm) by using a black light (15 W/cm), whereby a laminated sheet having a total thickness of 310 μm, comprising the 38 μm-thick polyester fiber laminate fabric, the highly hydrous crosslinked polymer layer laminated on the both surfaces of the polyester fiber laminate fabric, and the release-treated PET film formed on the upper and lower outermost layers was obtained. Then, the upper film was separated, and the above-mentioned highly hydrous crosslinked polymer was heated at 130° C. for 10 min to give a porous double-faced pressure-sensitive adhesive sheet having a total thickness of about 0.3 mm, comprising a porous layer on the both surfaces of the polyester fiber laminate fabric.

Example 1

Assuming step 4 (separation of two optical elements from optical laminate) of the method of the present invention, the following test was performed.
(Production of Test Piece)
Glass plate A as an LCD panel (manufactured by Matsunami Glass Ind., Ltd., thickness 1.35 mm, size: length 83 mm×width 55 mm) and glass plate B as a cover lens (manufactured by Matsunami Glass Ind., Ltd., thickness 0.7 mm, size: length 120 mm×width 60 mm) were prepared. The double-faced adhesive sheet (thickness 175 μm) obtained in Production Example 1 was cut in a size of length 83 mm×width 55 mm. One separator was peeled off, and one adhesive surface was adhered to the surface of glass plate A by one reciprocation of a hand roller. Then, the other separator was peeled off, and the other adhesive surface thereof was adhered to the surface of glass plate B under the following conditions to give a test piece having a constitution of glass plate/double-faced adhesive sheet/glass plate (size: length 120 mm×width 60 mm).
(Adhesion Conditions)
 surface pressure: 0.25 MPa
 degree of vacuum: 100 Pa
 adhesion time: 5 sec
Then, the above-mentioned test piece was cast into an autoclave, and treated in an autoclave under the conditions of temperature 50° C. and pressure 0.5 MPa for 15 min to give an assumed optical laminate in the method of the present invention.

The above-mentioned test piece was left standing under the environment of 23° C. and 50% RH for 1 hr, and two glass plates A, B were separated from the test piece by the method described below.
(Plate Separation)
Using an apparatus having the constitution shown in FIG. 3 and under the conditions shown in Table 1, two glass plates A and B constituting the test piece were relatively rotated. That is, glass plate A as an LCD panel was inserted and fixed in a flame 7 formed on the surface of a pedestal 8 of the second jig 9, and glass plate B as a cover glass was fixed on the first jig 6 via the porous double-faced adhesive sheet produced in Production Example 2. The first jig 6 was rotated by a servo-motor 10 controlled by a microcomputer to relatively rotate glass plates A and B under the conditions shown in Table 1. The rotation axis of the relative rotation was the center of gravity of glass plates A and B. Thereafter, the second jig 9 was linearly moved at a rate of 300 mm/sec (glass plate A was linearly moved parallel to glass plate B) to divide the double-faced adhesive sheet interposed between glass plates A and B to separate glass plates A and B. The temperature of the test piece in the test was set to 23° C.

The surfaces of glass plates A and B after separation were washed with isopropyl alcohol to remove the attached adhesive remaining thereon. The surfaces after washing were observed with a digital microscope (manufactured by KEYENCE CORPORATION, trade name "VHF-100F"). As a result, the glass plates A and B did not have crack, breakage, scar, etc.

Comparative Example 1

Figure 3:
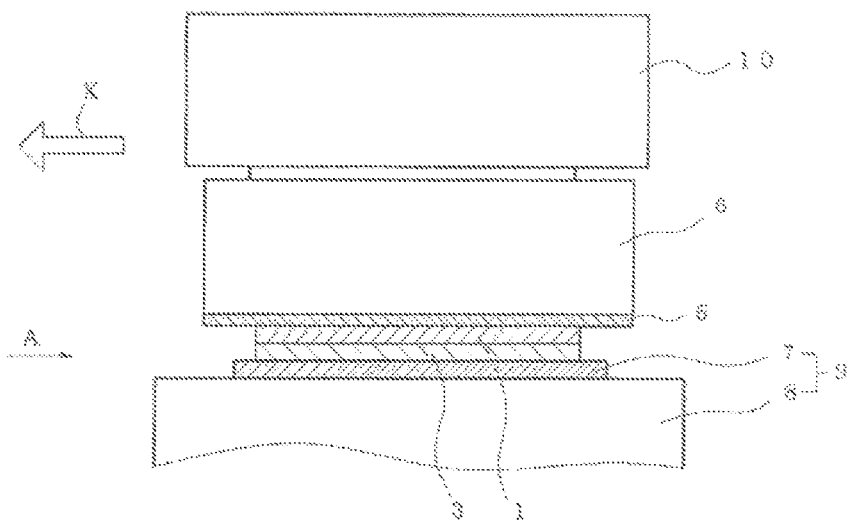
FIG. 3 is a schematic sectional view of the main part of one embodiment of an automatic machine for performing step 4 of the method of the present invention.
Figure 3:
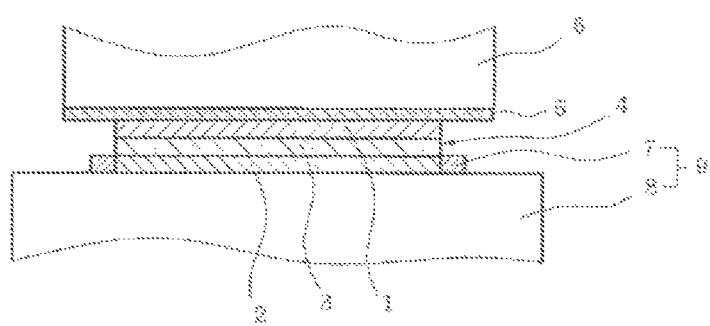
Figure 4:
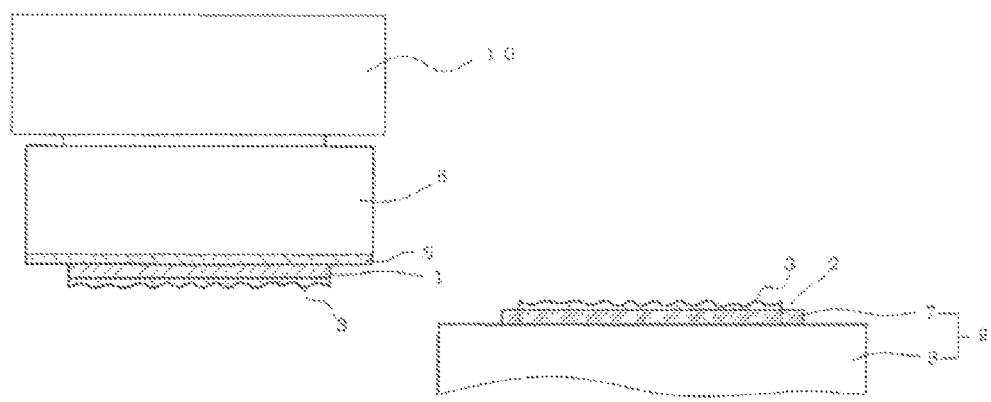
FIG. 4 is a view schematically showing the state of the two optical elements separated by the automatic machine of FIG. 3.

The same test piece produced in Example 1 was set on an apparatus having the constitution shown in FIG. 3. Immediately thereafter, without rotating the first jig 6, the second jig 9 was linearly moved for 83 seconds at a rate of 1 mm/sec (glass plate A was linearly moved in parallel to glass plate B) to divide the double-faced adhesive sheet interposed between glass plates A and B to separate glass plates A and B.

The surfaces of glass plates A and B after separation were washed with isopropyl alcohol to remove the attached adhesive remaining thereon. The surfaces after washing were observed with a digital microscope (manufactured by KEYENCE CORPORATION, trade name "VHF-100F"). As a result, crack, breakage, scar, etc. were not observed on the glass plates A, B.

Comparative Example 2

The same test piece produced in Example 1 was set on an apparatus having the constitution shown in FIG. 3. Immediately thereafter, without rotating the first jig 6, the second jig 9 was linearly moved at a rate of 300 mm/sec (glass plate A was linearly moved in parallel to glass plate B) to divide the double-faced adhesive sheet interposed between glass plates A and B to try to separate glass plates A and B. However, they could not be separated, and the test piece was detached from the double-faced adhesive sheet. In addition, an end of the glass plate in the test piece was broken.

Comparative Example 3

The same test piece produced in Example 1 was set on an apparatus having the constitution shown in FIG. 3. Immediately thereafter, without rotating the first jig 6, the second jig 9 was linearly moved at a rate of 50 mm/sec (glass plate A was linearly moved in parallel to glass plate B) to divide the double-faced adhesive sheet interposed between glass plates A and B to try to separate glass plates A and B. However, they could not be separated, and the test piece was detached from the double-faced adhesive sheet. In addition, an end of the glass plate in the test piece was broken.

TABLE 1

| | relative rotation | | | | parallel movement | | time required | |
|---|---|---|---|---|---|---|---|---|
| | initial motion (acceleration) degrees/seconds$^2$ | charging speed (rotating speed) degrees/seconds | constant speed rotation time seconds | constant speed rotation angle degrees | speed mm/seconds | operation time seconds | for whole operation seconds | state of glass plate |
| Example 1 | 7.5 | 3 | 10 | 30 | 300 | 1 | 11 | ○ (no crack, breakage, scar) |
| Comparative Example 1 | | | | | 1 | 83 | 83 | ○ (no crack, breakage, scar) |
| Comparative Example 2 | | | | | 300 | 2 | 6 | x (broken edge) |
| Comparative Example 3 | | | | | 50 | 12 | 16 | x (broken edge) |

The results of Table 1 reveal that the method of the present invention having step 4 can reusably recover optical elements from an optical laminate that was rejected by an appearance check. Using a step line for producing an optical laminate by reusing the optical element recovered from step 4, the total cost including material costs and energy costs for the industrial production (large-scale production) of a flat panel display can be greatly reduced.

This application is based on a patent application No. 2012-055115 filed in Japan, the contents of which are incorporated in full herein.

The invention claimed is:

1. A method of producing a flat panel display comprising an optical laminate wherein two optical elements are adhered to each other via an adhesive sheet or a curable resin layer, which comprises
the following step 1-step 4, or step 1-step 5, and permits reuse of at least one of the optical elements after step 4 or step 5 as an optical element in step 1:
step 1: a step of adhering two optical elements to each other via an adhesive sheet or a curable resin layer, and applying an autoclave treatment to give an optical laminate
step 2: a step of checking the appearance of the optical laminate obtained in step 1
step 3: a step of assembling a flat panel display using the optical laminate that passed the check in step 2
step 4: a step of separating the two optical elements in an optical laminate that was rejected by the check in step 2 by relatively rotating them with a vertical line penetrating the opposing faces thereof as a rotation axis
step 5: a step of washing the optical elements resulting from step 4, and
wherein the relative rotation of the optical elements in step 4 comprises accelerating in the initial motion and rotating the two optical elements after the initial motion at a rate of not less than 0.01 (degrees/sec) and less than 50 (degrees/sec).

2. The method according to claim 1, wherein step 4 is performed by an automatic machine.

3. The production method according to claim 1, wherein step 4 comprises relatively rotating the two optical elements with a vertical line penetrating the opposing faces thereof as a rotation axis, and then relatively moving the two optical elements in parallel to each other.

4. The method according to claim 1, wherein the rotation axis in the relative rotation of the optical elements is a vertical line penetrating the center of gravity (center) of the opposing faces of the two optical elements or the vicinity thereof.

5. The method according to claim 1, wherein the initial motion occurs within 1 second from the start of the rotation.

6. The method according to claim 5, wherein the acceleration in the initial motion is less than 30000 (degrees/sec2).

7. The method according to claim 1, wherein the two optical elements in the optical laminate are a display panel and a touch panel, a display panel and a transparent protection plate, or a touch panel and a transparent protection plate.

8. The method according to claim 1, wherein the two optical elements in the optical laminate are adhered to each other via an adhesive sheet or a curable resin layer having an area approximately the same as that of the opposing surfaces of the two optical elements.

9. The method according to claim 1, wherein the adhesive sheet is an acrylic adhesive sheet containing an acrylic polymer (X).

10. The method according to claim 9, wherein the aforementioned acrylic polymer (X) comprises a monomer component comprising 50-100 wt % of (meth)acrylic acid alkyl ester having a straight chain or branched chain alkyl group having 1-14 carbon atoms and not less than 0 wt % and less than 15 wt % of a polar group-containing monomer relative to the total amount (100 wt %) of the monomer component.

11. The method according to claim 9, wherein the acrylic adhesive sheet has a gel fraction of 20-75 wt %.

12. A method of producing a flat panel display comprising an optical laminate wherein two optical elements are adhered to each other via an adhesive sheet, which comprises
step 1: a step of adhering two optical elements to each other via an adhesive sheet, and applying an autoclave treatment to give an optical laminate
step 2: a step of checking the appearance of the optical laminate obtained in step 1
step 3: a step of assembling a flat panel display using the optical laminate that passed the check in step 2
step 4: a step of separating the two optical elements in an optical laminate that was rejected by the check in step 2 by an automatic machine
step 5: a step of washing the optical elements resulting from step 4, wherein the adhesive sheet is an acrylic adhesive sheet containing an acrylic polymer (X), wherein the aforementioned acrylic polymer (X) comprises a monomer component comprising 50-100 wt % of (meth)acrylic acid alkyl ester having a straight chain or branched chain alkyl group having 1-14 carbon atoms and not less than 0 wt % and less than 15 wt % of a polar group-containing monomer relative to the total amount (100 wt %) of the monomer component, and wherein the acrylic adhesive sheet has a gel fraction of 20-75 wt %.

* * * * *